(12) United States Patent
Teng et al.

(10) Patent No.: US 11,855,543 B2
(45) Date of Patent: Dec. 26, 2023

(54) ENERGY CONVERSION DEVICE, POWER SYSTEM AND VEHICLE

(71) Applicant: BYD COMPANY LIMITED, Guangdong (CN)

(72) Inventors: Jingcui Teng, Shenzhen (CN); Shulin Liang, Shenzhen (CN); Yu Liu, Shenzhen (CN); Chao Wang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 39 days.

(21) Appl. No.: 17/624,055

(22) PCT Filed: Jun. 18, 2020

(86) PCT No.: PCT/CN2020/096851
§ 371 (c)(1),
(2) Date: Dec. 30, 2021

(87) PCT Pub. No.: WO2021/000740
PCT Pub. Date: Jan. 7, 2021

(65) Prior Publication Data
US 2022/0360184 A1    Nov. 10, 2022

(30) Foreign Application Priority Data

Jun. 30, 2019   (CN) .......................... 201910582158.7

(51) Int. Cl.
*H02M 3/335* (2006.01)

(52) U.S. Cl.
CPC ... *H02M 3/33584* (2013.01); *H02M 3/33571* (2021.05)

(58) Field of Classification Search
CPC ............. H02M 3/335; H02M 3/33571; H02M 3/33584
See application file for complete search history.

(56) References Cited

U.S. PATENT DOCUMENTS

| 2008/0094013 | A1  | 4/2008 | Su |
| 2011/0089886 | A1* | 4/2011 | Dubovsky ................ H02J 7/35 320/101 |

(Continued)

FOREIGN PATENT DOCUMENTS

| CN | 102130611 A | 7/2011 |
| CN | 102751772 A | 10/2012 |

(Continued)

OTHER PUBLICATIONS

International Search Report and Written Opinion for Application No. PCT/CN2020/096851, dated Sep. 22, 2020, 9 pages.

*Primary Examiner* — Gary L Laxton

(57) ABSTRACT

An energy conversion apparatus includes: an inductor, where a first end of the inductor is connected to an external charging port; a bridge arm converter, connected between an external battery and the external charging port, where the bridge arm converter includes a first phase bridge arm, a second phase bridge arm, and a third phase bridge arm connected in parallel, and a second end of the inductor is connected to the first phase bridge arm; a voltage transformation unit, where an input end of the voltage transformation unit is connected to the second phase bridge arm and the third phase bridge arm; and a first bidirectional H-bridge, connected between an output end of the voltage transformation unit and the external battery. The external battery is connected to and drives an external motor. The external charging port is connected to a power supply and charges the external battery.

17 Claims, 14 Drawing Sheets

(56) References Cited

U.S. PATENT DOCUMENTS

| | | | |
|---|---|---|---|
| 2014/0097792 | A1 | 4/2014 | Su |
| 2014/0368131 | A1 | 12/2014 | Katsumata et al. |
| 2019/0148973 | A1 | 5/2019 | Kim |

FOREIGN PATENT DOCUMENTS

| | | | |
|---|---|---|---|
| CN | 103269113 | A | 8/2013 |
| CN | 104485700 | A | 4/2015 |
| CN | 204905907 | U | 12/2015 |
| CN | 105244982 | A | 1/2016 |
| CN | 105644373 | A | 6/2016 |
| CN | 205453254 | U | 8/2016 |
| CN | 106314184 | A | 1/2017 |
| CN | 106611975 | A | 5/2017 |
| CN | 106899046 | A | 6/2017 |
| CN | 107284273 | A | 10/2017 |
| CN | 207725217 | U | 8/2018 |
| CN | 208401600 | U | 1/2019 |
| DE | 102012009219 | A1 | 8/2013 |
| DE | 102012218512 | A1 | 4/2014 |
| EP | 2908420 | A1 | 8/2015 |
| JP | H6-054410 | A | 2/1994 |
| JP | 2014-512787 | A | 5/2014 |
| JP | 201619550 | A | 2/2016 |
| JP | 2017017765 | A | 1/2017 |

\* cited by examiner

ENERGY CONVERSION DEVICE, POWER SYSTEM AND VEHICLE

CROSS-REFERENCE TO RELATED APPLICATIONS

This application is a National Phase Application of International Patent Application No. PCT/CN2020/096851, filed on Jun. 18, 2020, which is based on and claims priority to and benefits of Chinese Patent Application 201910582158.7, entitled "ENERGY CONVERSION DEVICE, POWER SYSTEM AND VEHICLE" and filed on Jun. 30, 2019. The entire content of all of the above identified applications is incorporated herein by reference.

FIELD

This application relates to the field of electronic technologies, and in particular, to an energy conversion apparatus, a power system, and a vehicle.

BACKGROUND

In recent years, investment in electric vehicles is continuously increased, technologies related to the electric vehicles are rapidly developed, acceptance of the electric vehicles by the market is continuously growing, and battery charging and motor drive serving as core technologies in the electric vehicles attract wide attention. Currently, a battery charging circuit and a motor drive circuit in an existing electric vehicle on the market generally are separated. The battery charging circuit is used for charging a battery of the electric vehicle, and the motor drive circuit is used for driving a motor of the electric vehicle. The two circuits do not interfere with each other and are independent of each other.

However, although battery charging and motor drive processes of the electric vehicle can be completed by using the two circuits respectively, the two circuits in the foregoing method do not interfere with each other and are independent of each other. As a result, a control circuit including the battery charging circuit and the motor drive circuit has a complex structure, low integration, a large volume, and high costs.

In summary, problems that the overall control circuit including the battery charging circuit and the motor drive circuit has the complex structure, the low integration, the large volume, and the high costs exist in the related art.

SUMMARY

This application aims to resolve one of technical problems in the related art at least to some extent.

An objective of this application is to provide an energy conversion apparatus, a power system, and a vehicle, to resolve existing problems that an overall control circuit including a battery charging circuit and a motor drive circuit has a complex structure, low integration, a large volume, and high costs.

This application is implemented as follows. An energy conversion apparatus is provided, including:
  an inductor, where a first end of the inductor is connected to an external charging port;
  a bridge arm converter, connected between an external battery and the external charging port, where the bridge arm converter includes a first phase bridge arm, a second phase bridge arm, and a third phase bridge arm connected in parallel, and a second end of the inductor is connected to the first phase bridge arm;
  a voltage transformer, where an input end of the voltage transformer is connected to the second phase bridge arm and the third phase bridge arm; and
  a first bidirectional H-bridge, connected between an output end of the voltage transformer and the external battery, where
  the external battery is connected to an external motor by the bridge arm converter, and the external charging port is connected to the external battery by the inductor, the bridge arm converter, the voltage transformer, and the first bidirectional H-bridge; and
  the external battery drives the external motor by using the energy conversion apparatus, and the external charging port is connected to a power supply, and charges the external battery by using the energy conversion apparatus.

Another objective of this application is to provide a power system, including the foregoing energy conversion apparatus and a controller, where the energy conversion apparatus includes:
  an in-vehicle charger, including an inductor, where the inductor is connected to an external charging port;
  a motor controller, including a bridge arm converter, where the bridge arm converter is connected to the external charging port, the inductor, an external motor, and an external battery; and
  a bidirectional DC/DC converter, including a voltage transformer and a first bidirectional H-bridge, where an input end of the voltage transformer is connected to the bridge arm converter, the output end of the voltage transformer is connected to a first end of the first bidirectional H-bridge, and a second end of the first bidirectional H-bridge is connected to the external battery, where
  the external battery is connected to the motor by the bridge arm converter, and the external charging port is connected to the external battery by the inductor, the bridge arm converter, the voltage transformer, and the first bidirectional H-bridge; and
  the controller is configured to control the energy conversion apparatus to drive the motor, and when the external charging port is connected to a power supply, the controller is further configured to control the energy conversion apparatus to charge the external battery.

Another objective of this application is to provide an energy conversion apparatus, including:
  a charging connection end group, including a first charging connection end and a second charging connection end;
  a bridge arm converter, including a first phase bridge arm, a second phase bridge arm, and a third phase bridge arm, where the first phase bridge arm, the second phase bridge arm, and the third phase bridge arm are connected in parallel to form a first confluence end and a second confluence end, and the second confluence end is connected to the second charging connection end;
  an inductor, where an end of the inductor is connected to the first charging connection end, and the other end is connected to a midpoint of the first phase bridge arm;
  a drive output connection end group, including a first drive output connection end, a second drive output connection end, and a third drive output connection end, where the first drive output connection end is connected to the midpoint of the first phase bridge arm, the second drive output connection end is connected to a midpoint of the second phase bridge arm, and the third drive output connection end is connected to a midpoint of the third phase bridge arm;

a voltage transformer, where an input end of the voltage transformer is connected to the midpoint of the second phase bridge arm and the midpoint of the third phase bridge arm;

a first bidirectional H-bridge, where an input end of the first bidirectional H-bridge is connected to an output end of the voltage transformer; and an energy storage connection end group, including a first energy storage connection end and a second energy storage connection end, where the first energy storage connection end is connected to the first confluence end, the second energy storage connection end is connected to the second confluence end, and an output end of the first bidirectional H-bridge is connected to the first energy storage connection end and the second energy storage connection end.

Another objective of this application is to provide a power system, including the foregoing energy conversion apparatus and a controller, where the energy conversion apparatus includes:

an in-vehicle charger, including an inductor and a charging connection end group, where the charging connection end group includes a first charging connection end and a second charging connection end, and an end of the inductor is connected to the first charging connection end;

a motor controller, including a bridge arm converter and a drive output connection end group, where the bridge arm converter includes a first phase bridge arm a second phase bridge arm, and a third phase bridge arm, a midpoint of the first phase bridge arm is connected to the other end of the inductor, the first phase bridge arm, the second phase bridge arm, and the third phase bridge arm are connected in parallel to form a first confluence end and a second confluence end, and the second confluence end is connected to the second charging connection end; and the drive output connection end group includes a first drive output connection end, a second drive output connection end, and a third drive output connection end, where the first drive output connection end is connected to the midpoint of the first phase bridge arm, the second drive output connection end is connected to a midpoint of the second phase bridge arm, and the third drive output connection end is connected to a midpoint of the third phase bridge arm;

a bidirectional DC/DC converter, including a voltage transformer, a first bidirectional H-bridge, and an energy storage connection end group, where an input end of the voltage transformer is connected to the midpoint of the second phase bridge arm and the midpoint of the third phase bridge arm, and an output end of the voltage transformer is connected to an input end of the first bidirectional H-bridge; and the energy storage connection end group includes a first energy storage connection end and a second energy storage connection end, where the first energy storage connection end is connected to the first confluence end, the second energy storage connection end is connected to the second confluence end, and an output end of the first bidirectional H-bridge is respectively connected to the first energy storage connection end and the second energy storage connection end.

Another objective of this application is to provide a vehicle, including the foregoing power system.

This application provides an energy conversion apparatus, a power system, and a vehicle. By using an inductor, a bridge arm converter, a voltage transformer, and a first bidirectional H-bridge in the energy conversion apparatus, the energy conversion apparatus may work in a drive mode and a charging mode in a time-sharing manner. During drive of a motor, a battery, the bridge arm converter, and the motor form a drive circuit for driving the motor. During charging, a charging port, the inductor, the bridge arm converter, the voltage transformer, the first bidirectional H-bridge, and the battery form a charging circuit. Therefore, in the drive circuit and the charging circuit, the bridge arm converter is reused, which not only simplifies a circuit structure, but also improves integration, thereby reducing a volume and reducing costs, to resolve existing problems that an overall control circuit including a battery charging circuit and a motor drive circuit has a complex structure, low integration, a large volume, and high costs.

The bridge arm converter in the disclosure may be divided into two parts. The first phase bridge arm cooperates with the inductor, to boost a direct current (DC), and remaining two phase bridge arms form a bidirectional H-bridge configured to convert the DC into an alternating current (AC). Therefore, all the bridge arms of the bridge arm converter in the disclosure are used, thereby improving the utilization of switch tubes and the integration of the circuit.

In the disclosure, a voltage transformer and a first bidirectional H-bridge are disposed between the bridge arm converter and the battery to implement isolated charging, thereby improving the charging safety performance of electric vehicles. In addition, the bidirectional DC/DC converter in the disclosure uses the remaining two phase bridge arms of the bridge arm converter as a front bidirectional H-bridge, thereby reducing a demand for the switch tubes, further reducing the costs, and also improving the integration of the circuit.

Additional aspects and advantages of this application are partially given in the following description, some of which become apparent in the following description or understood through practices of this application.

DETAILED DESCRIPTION

Figure 1:
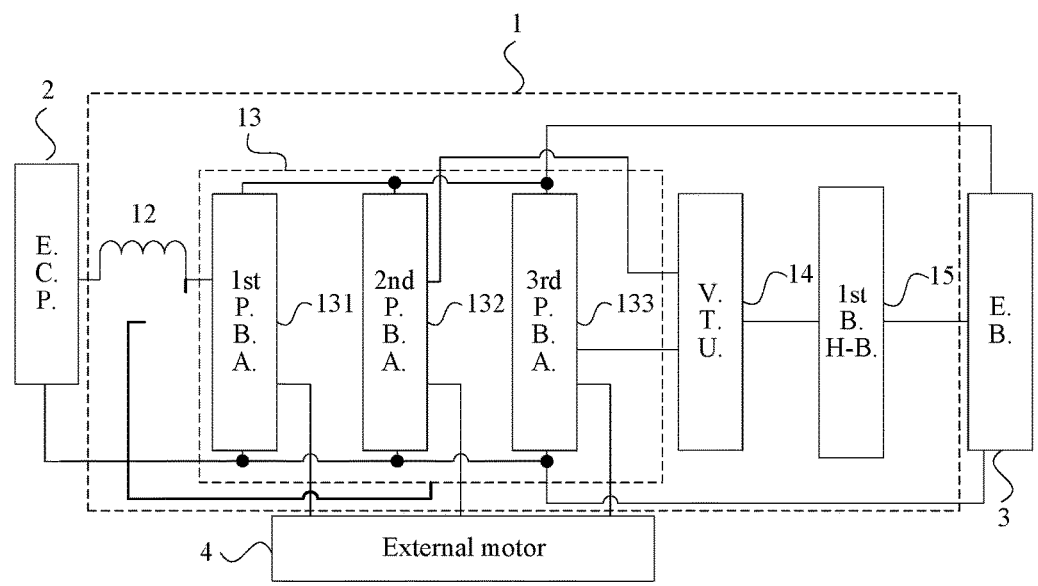
FIG. 1 is a schematic diagram of a module structure of an apparatus according to a first embodiment of this application.

Embodiments of this application are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary, and are intended to explain this application and cannot be construed as a limitation to this application.

The following describes implementations of this application in detail with reference to specific accompanying drawings.

Figure 2:
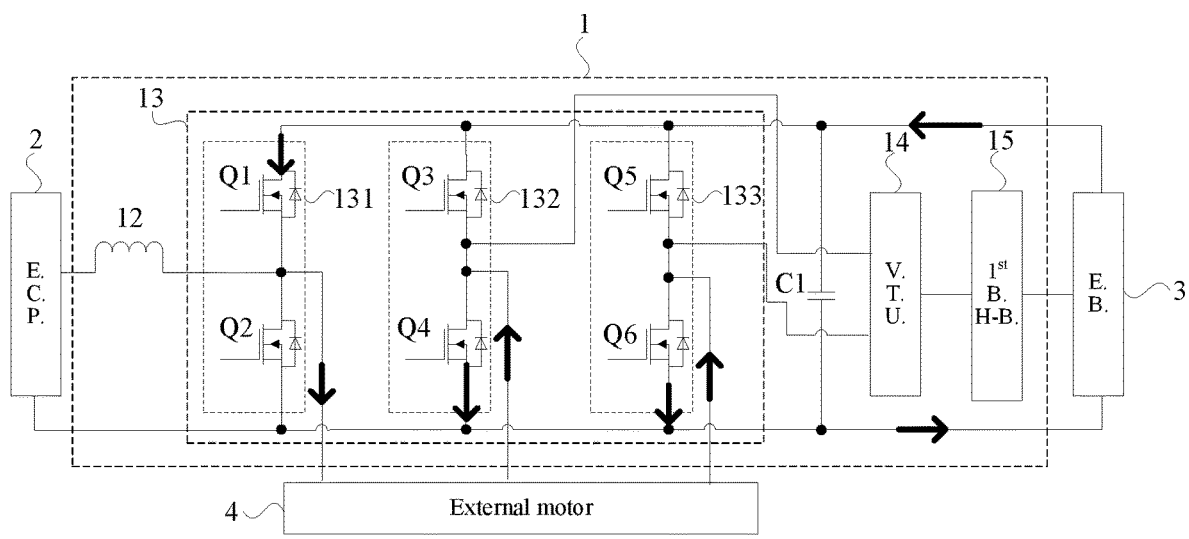
FIG. 2 is a schematic diagram of a circuit structure of the apparatus according to the first embodiment of this application.
Figure 3:
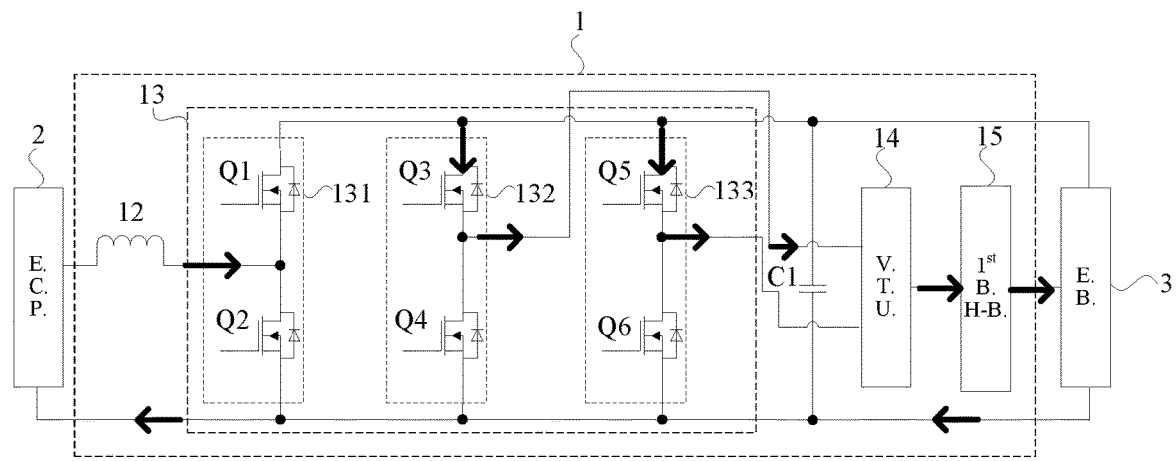
FIG. 3 is a schematic diagram of another circuit structure of the apparatus according to the first embodiment of this application.

FIG. 1 to FIG. 3 show module structures of an energy conversion apparatus 1 according to a first embodiment of this application. For ease of description, only a part that is related to this embodiment is shown, and detailed description is as follows.

As shown in FIG. 1, the energy conversion apparatus 1 provided in the embodiments of this application includes an inductor 12, a bridge arm converter 13, a voltage transformation unit 14, and a first bidirectional H-bridge 15.

Specifically, referring to FIG. 1, the bridge arm converter 13 includes a first phase bridge arm 131, a second phase bridge arm 132, and a third phase bridge arm 133 connected in sequence. An end of an external charging port 2 is connected to an end of the inductor 12, and the other end of the external charging port 2 is connected to the bridge arm converter 13. The other end of the inductor 12 is connected to the first phase bridge arm 131. The first phase bridge arm 131, the second phase bridge arm 132, and the third phase bridge arm 133 are connected in parallel, the second phase bridge arm 132 and the third phase bridge arm 133 are respectively connected to an input end of the voltage transformation unit 14, an output end of the voltage transformation unit 14 is connected to an input end of the first bidirectional H-bridge 15, and an output end of the first bidirectional H-bridge 15 is connected to an external battery 3. The bridge arm converter 13 is further connected between the external battery 3 and an external motor 4.

The energy conversion apparatus 1 works in a drive mode and a charging mode in a time-sharing manner.

When the energy conversion apparatus 1 works in the drive mode, as shown in FIG. 2, in the drive mode, the external battery 3, the bridge arm converter 13, and the external motor 4 form a drive circuit for driving the external motor 4, the external battery 3 provides a DC to the bridge arm converter 13, the first phase bridge arm 131 in the bridge arm converter 13 converts the DC into a three-phase AC, and inputs the three-phase AC to the external motor 4 to drive the external motor 4 to run. The external motor 4 outputs an AC, the AC is converted by using the second phase bridge arm 132 and the third phase bridge arm 133 in the bridge arm converter 13, and a DC is outputted and is returned to the external battery 3.

When the energy conversion apparatus 1 works in the charging mode, as shown in FIG. 3, in the charging mode, the external charging port 2, the inductor 12, the bridge arm converter 13, the voltage transformation unit 14, and the first bidirectional H-bridge 15 form a charging circuit for charging the external battery 3. For the external charging port 2, in the foregoing charging mode, a power supply provided by the external charging port 2 for the charging circuit may be a DC power supply.

When the external charging port 2 provides the DC power supply, as shown in FIG. 3, the external charging port 2, the inductor 12, the bridge arm converter 13, the voltage transformation unit 14, the first bidirectional H-bridge 15, and the external battery 3 form a DC charging circuit. In this case, a DC outputted by the external charging port 2 is boosted through the inductor 12 and the first phase bridge arm 131 in the bridge arm converter 13, a DC is outputted, the DC outputted by the first phase bridge arm 131 is converted by using the second phase bridge arm 132 and the third phase bridge arm 133 in the bridge arm converter 13, an AC is outputted, the voltage transformation unit 14 converts a high-frequency AC and outputs another high-frequency AC, and the first bidirectional H-bridge 15 rectifies the high-frequency AC outputted by the voltage transformation unit 14 and outputs a DC for charging the external battery 3.

In some embodiments, the external charging port 2, the inductor 12, the first phase bridge arm 131, and the external battery 3 form a DC charging circuit. In this case, the DC outputted by the external charging port 2 is boosted through the inductor 12 and the first phase bridge arm 131 in the bridge arm converter 13, and a DC is outputted to charge the external battery 3.

For the inductor 12, in the foregoing charging mode, the inductor 12 is configured to store and release electric energy.

For the bridge arm converter 13, the bridge arm converter 13 includes at least three phase bridge arms connected in parallel, each phase bridge arm is connected to the external battery 3 and the external motor 4, and each phase bridge arm includes two power switches connected in series. In the foregoing drive mode, the bridge arm converter 13 is configured to convert electric energy inputted by the external battery 3 and output a three-phase AC to drive the external motor 4. In the foregoing charging mode, the bridge arm converter 13 is configured to convert electric energy in a charging loop and output a DC or a high-frequency AC, and a charging power is also increased, to charge the external battery 3.

Figure 4:
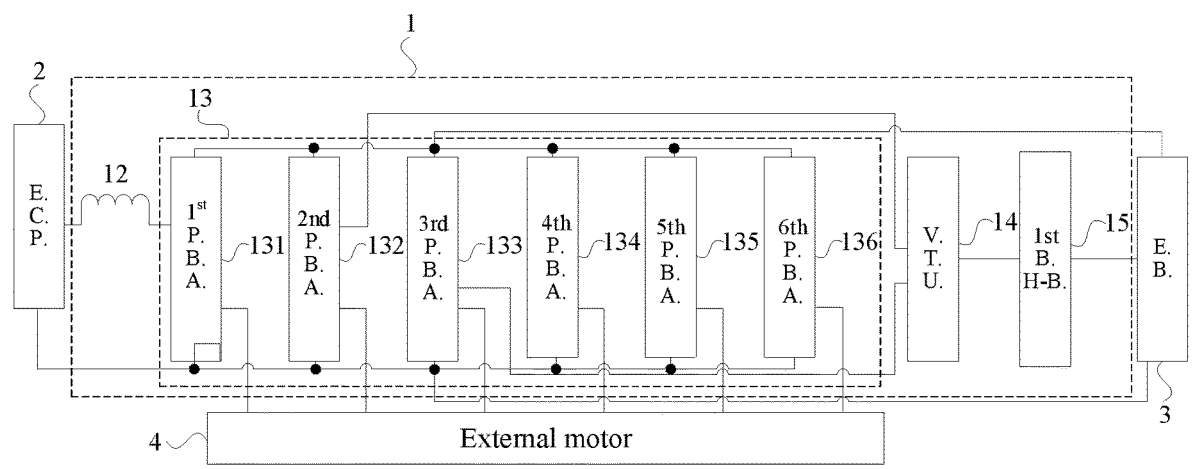
FIG. 4 is a schematic diagram of another module structure of the apparatus according to the first embodiment of this application.

It should be noted that, referring to FIG. 4, the bridge arm converter 13 in this embodiment may be another multi-phase bridge arm converter, for example, a six-phase bridge arm converter. In this case, the bridge arm converter 13 has six phase bridge arms, which are respectively a first phase bridge arm 131, a second phase bridge arm 132, a third phase bridge arm 133, a fourth phase bridge arm 134, a fifth phase bridge arm 135, and a sixth phase bridge arm 136 connected in parallel with each other. Each phase bridge arm is connected to the external battery 3 and the external motor 4, and each phase bridge arm includes two power switches connected in series. In addition, as shown in FIG. 4, bridge arms connected to the voltage transformation unit are not limited to the second phase bridge arm 132 and the third phase bridge arm 133, or may be other bridge arms that can convert a DC outputted by the first phase bridge arm 131 into an AC. For example, the other bridge arms may be the third phase bridge arm 133 and the fourth phase bridge arm 134, which are not specifically limited herein.

For the voltage transformation unit 14, in the foregoing charging mode, the voltage transformation unit 14 is configured to convert an AC inputted in the charging loop into another AC for output, to isolate circuits on two sides of the voltage transformation unit 14.

For the first bidirectional H-bridge 15, the first bidirectional H-bridge 15 includes at least two bridge arms connected in parallel, and each bridge arm includes two power switches connected in series. In the foregoing charging mode, the first bidirectional H-bridge 15 is configured to rectify the AC in the charging loop and output a DC for charging the external battery 3.

During specific implementation, the DC power supply provides a DC to the energy conversion apparatus 1 through the external charging port 2. The DC power supply may be a DC obtained by rectifying an external AC power supply, or may be a DC outputted by an external charging pile, which is not specifically limited herein.

In addition, it should be noted that, during specific operations, the energy conversion apparatus 1 may be not limited to operations in the foregoing drive mode and charging mode, and various working modes of the energy conversion apparatus 1 are described subsequently in detail. Details are not described herein again.

In this embodiment, by using the energy conversion apparatus 1 including the inductor 12, the bridge arm converter 13, the voltage transformation unit 14, and the first bidirectional H-bridge 15, the energy conversion apparatus 1 works in the drive mode and the charging mode in a time-sharing manner. During drive of the external motor 4, the external battery 3, the bridge arm converter 13, and the external motor 4 form the drive circuit for driving the external motor 4. During charging, the external charging port 2, the inductor 12, the first phase bridge arm 131, and the external battery 3 form a charging circuit, or the external charging port 2, the inductor 12, the bridge arm converter 13, the voltage transformation unit 14, the first bidirectional H-bridge 15, and the external battery 3 form a charging circuit. Therefore, in the drive circuit and the charging circuit, the bridge arm converter 13 is reused, which not only simplifies a circuit structure, but also improves integration, thereby reducing a volume and reducing costs, to resolve existing problems that an overall control circuit including the battery charging circuit and the motor drive circuit has a complex structure, low integration, a large volume, and high costs.

Figure 5:
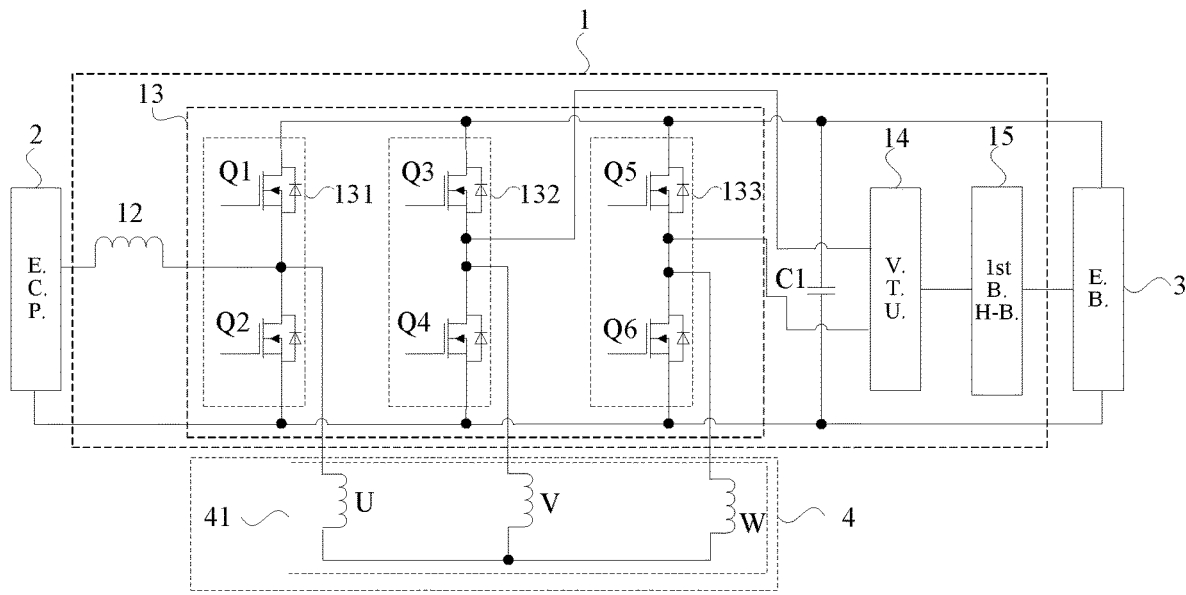
FIG. 5 is a schematic structural diagram of an apparatus according to a second embodiment of this application.

In another embodiment of this application, in an implementation of this application, as shown in FIG. 5, the external motor 4 includes a motor coil 41, the first phase bridge arm 131 includes a first power switch Q1 and a second power switch Q2 connected in series, the second phase bridge arm 132 includes a third power switch Q3 and a fourth power switch Q4 connected in series, and the third phase bridge arm 133 includes a fifth power switch Q5 and a sixth power switch Q6 connected in series.

Specifically, a first midpoint between the first power switch Q1 and the second power switch Q2 is connected to the inductor 12, a second midpoint between the third power switch Q3 and the fourth power switch Q4 is connected to the voltage transformation unit 14, a third midpoint between the fifth power switch Q5 and the sixth power switch Q6 is connected to the voltage transformation unit 14, a first end of the first power switch Q1, a first end of the third power switch Q3, and a first end of the fifth power switch Q5 are connected together to form a first confluence end of the bridge arm converter 13, a second end of the second power switch Q2, a second end of the fourth power switch Q4, and a second end of the sixth power switch Q6 are connected together to form a second confluence end of the bridge arm converter 13, the second confluence end is connected to an external charging port 2, the first confluence end is connected to an end of an external battery 3, the second confluence end is connected to the other end of the external battery 3, the first midpoint is connected to a first phase coil of the motor coil 41, the second midpoint is connected to a second phase coil of the motor coil 41, and the third midpoint is connected to a third phase coil of the motor coil 41.

The first midpoint between the first power switch Q1 and the second power switch Q2 is a point on a connecting line between the first power switch Q1 and the second power switch Q2, and the inductor 12 is connected to both the first power switch Q1 and the second power switch Q2 by the point. Similarly, positions of the second midpoint and the third midpoint may be inferred. Details are not described herein again.

It should be noted that, in this implementation, a plurality of power switches in the bridge arm converter 13 may be implemented by using a device that is connected in parallel to a diode and may perform a switch action, for example, a switch device such as a power triode, a metal-oxide-semiconductor field-effect transistor (MOSFET), and an insulated gate bipolar transistor (IGBT).

In another embodiment of this application, when the bridge arm converter 13 works, a power switch in the first phase bridge arm 131, a power switch in the second phase bridge arm 132, and a power switch in the third phase bridge arm 133 receive control signals having a difference of a preset phase. It should be noted that, in this embodiment, the preset phase is preferably an angle of 120 degrees, but the preferable angle does not limit the preset phase.

In another embodiment of this application, in an implementation of this application, when the inductor 12 in the energy conversion apparatus 1 receives the DC, the inductor 12 may store and release the electric energy by switching between an on state and an off state of the first power switch Q1 and the second power switch Q2, to implement power factor correction (PFC).

In this implementation, three phase bridge arms of the bridge arm converter 13 are controlled in a three-phase interleaved control working manner, so that when the energy conversion apparatus 1 performs charging, a DC-side ripple is reduced and a charging power is increased. In addition, in a charging mode, the first phase bridge arm 131 may cooperate with the inductor 12 to complete the PFC, boosting is performed by using the first power switch Q1, and a DC voltage is outputted. By controlling cooperation between the power switches in the second phase bridge arm 132 and the third phase bridge arm 133, the second phase bridge arm 132 and the third phase bridge arm 133 may convert the DC into a high-frequency AC. In a drive mode, by controlling the three phase bridge arms in the bridge arm converter 13, electric energy inputted by the external battery 3 is converted, and a voltage and a current of the motor coil 41 are adjusted, to drive the external motor 4.

In another embodiment of this application, in an implementation of this application, as shown in FIG. 5, the energy conversion apparatus 1 further includes a first capacitor C1, and the first capacitor C1 is connected between the first confluence end and the second confluence end.

During specific operations, when the energy conversion apparatus 1 is in the charging mode, the first capacitor C1 filters a voltage outputted by the bridge arm converter 13, and may store energy according to the voltage outputted by the bridge arm converter 13, to complete a DC charging process of the external battery 3. In addition, when the energy conversion apparatus 1 is in the drive mode, the first capacitor C1 filters the voltage inputted to the bridge arm converter 13.

In this implementation, by arranging the first capacitor C1 in the energy conversion apparatus 1, in addition to filtering the voltage outputted by the bridge arm converter 13, the first capacitor C1 can store energy according to the voltage outputted by the bridge arm converter 13 to complete the charging of the external battery 3, thereby ensuring a normal charging function of the energy conversion apparatus 1, and also ensuring that other clutters do not interfere with the charging process. In addition, when the energy conversion apparatus 1 is in the drive mode, a voltage inputted to the bridge arm converter 13 may be further filtered.

Figure 6:
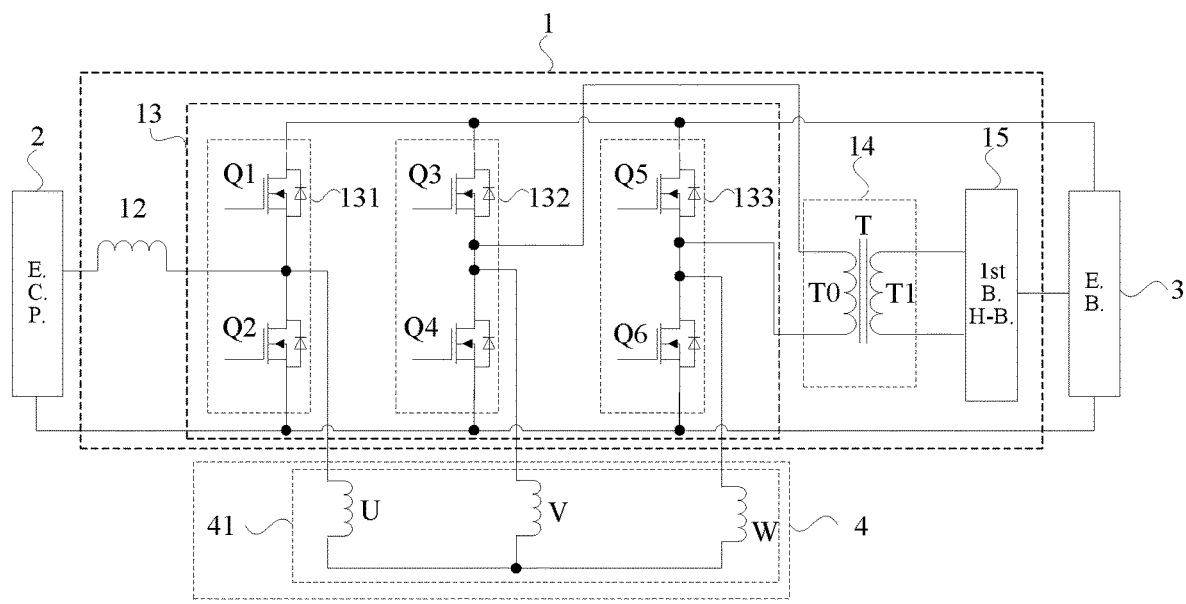
FIG. 6 is a schematic diagram of a circuit structure of an apparatus according to a third embodiment of this application.

In another embodiment of this application, in an implementation of this application, as shown in FIG. 6, the voltage transformation unit 14 in the energy conversion apparatus 1 includes a primary coil T0 and a first secondary coil T1.

Referring to FIG. 6, an end of the primary coil T0 is connected to a second midpoint, the other end of the primary coil T0 is connected to a third midpoint, and the first secondary coil T1 is connected to a first bidirectional H-bridge 15, so that an external charging port 2, an inductor 12, a bridge arm converter 13, the primary coil T0, the first secondary coil T1, the first bidirectional H-bridge 15, and an external battery 3 form a DC charging loop.

Figure 7:
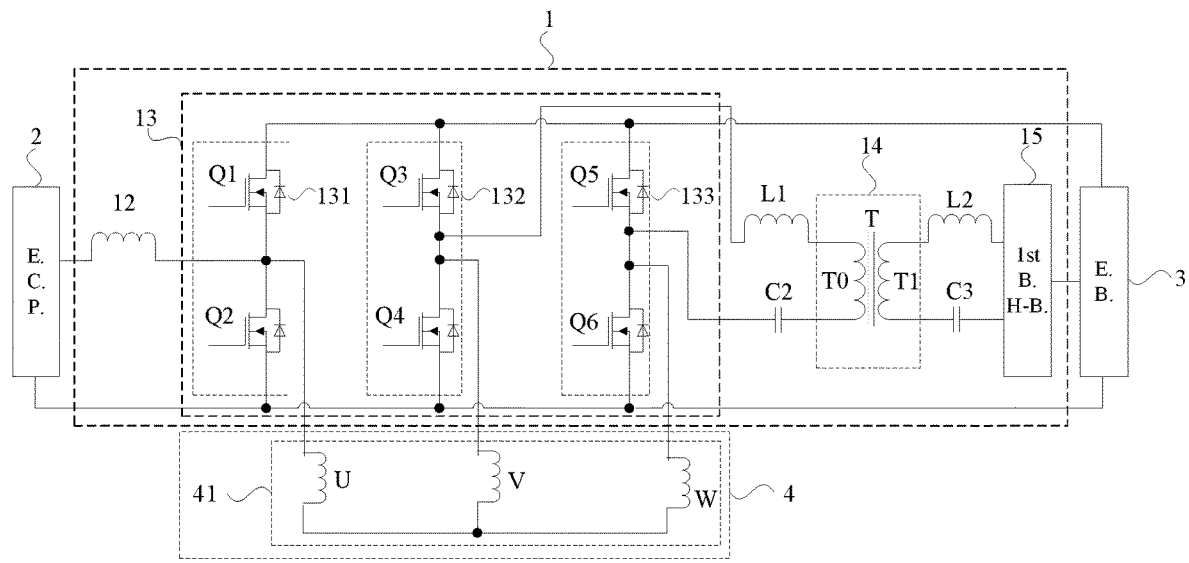
FIG. 7 is a schematic diagram of another circuit structure of the apparatus according to the third embodiment of this application.

Specifically, in an implementation of this application, as shown in FIG. 7, the energy conversion apparatus 1 further includes a first inductor L1 and a second capacitor C2.

Referring to FIG. 7 the first inductor L1 is disposed between a side of the primary coil T0 and the second midpoint, and the second capacitor C2 is disposed between the other side of the primary coil T0 and the third midpoint.

In this implementation, the external charging port 2, the inductor 12, the first phase bridge arm 131, the second phase bridge arm 132, the third phase bridge arm 133, the first inductor L1, the second capacitor C2, the primary coil T0, the first secondary coil T1, the first bidirectional H-bridge 15, and the external battery 3 form a DC charging circuit, and the first inductor L1 and the second capacitor C2 generate a resonance effect in the DC charging circuit, to assist power switches in the second phase bridge arm 132 and the third phase bridge arm 133 in implementing soft switching.

In an implementation of this application, referring to FIG. 7, the energy conversion apparatus 1 further includes a second inductor L2 and a third capacitor C3.

The second inductor L2 is disposed between a side of the first secondary coil T1 and the fourth midpoint, and the third capacitor C3 is disposed between the other side of the first secondary coil T1 and the fifth midpoint.

In this embodiment, the external charging port 2, the inductor 12, the first phase bridge arm 131, the second phase bridge arm 132, the third phase bridge arm 133, the primary coil T0, the first secondary coil T1, the second inductor L2, the third capacitor C3, a seventh power switch Q7, an eighth power switch Q8, a ninth power switch Q9, a tenth power switch Q10, and the external battery 3 form a DC charging circuit, and the second inductor L2 and the third capacitor C3 generate a resonance effect in the DC charging circuit, to assist power switches in a seventh phase bridge arm 151 and an eighth phase bridge arm 152 in implementing soft switching.

Figure 8:
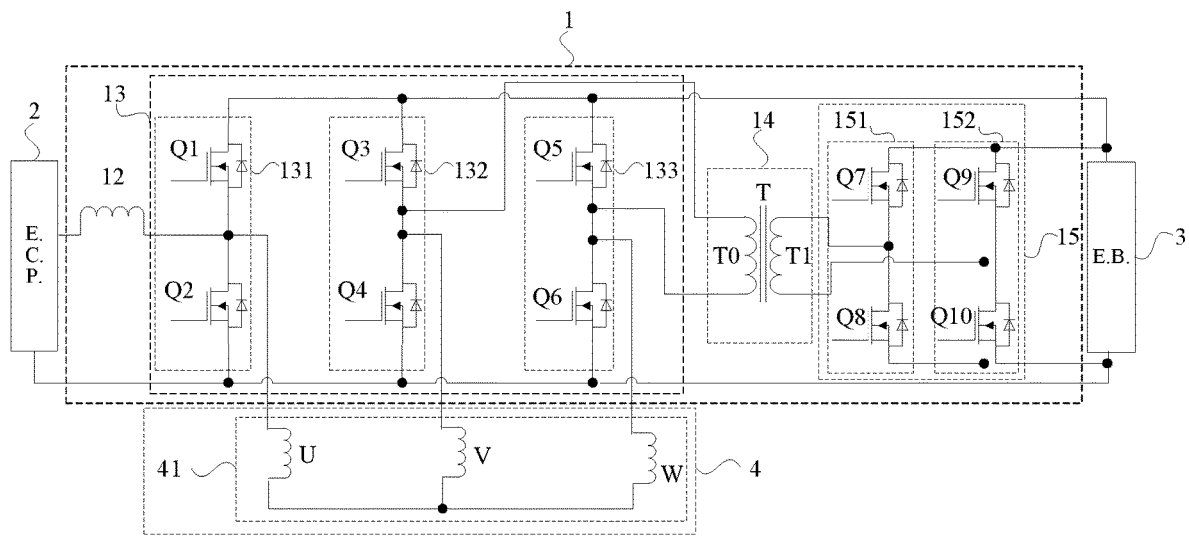
FIG. 8 is a schematic diagram of a circuit structure of an apparatus according to a fourth embodiment of this application.

In an implementation of this application, as shown in FIG. 8, the first bidirectional H-bridge 15 in the energy conversion apparatus 1 includes a seventh phase bridge arm 151 and an eighth phase bridge arm 152.

The seventh phase bridge arm 151 includes a seventh power switch Q7 and an eighth power switch Q8 connected in series, and the eighth phase bridge arm 152 includes a ninth power switch Q9 and a tenth power switch Q10 connected in series.

A fourth midpoint between the seventh power switch Q7 and the eighth power switch Q8 is connected to an end of the first secondary coil T1, a fifth midpoint between the ninth power switch Q9 and the tenth power switch Q10 is connected to the other end of the first secondary coil T1, a first end of the seventh power switch Q7 and a first end of the ninth power switch Q9 are connected together to form a third confluence end of the first bidirectional H-bridge 15, a second end of the eighth power switch Q8 and a second end of the tenth power switch Q10 are connected together to form a fourth confluence end of the first bidirectional H-bridge 15, the third confluence end is connected to an end of the external battery 3, and the fourth confluence end is connected to the other end of the external battery 3.

In this implementation, the external charging port 2, the inductor 12, the first phase bridge arm 131, the second phase bridge arm 132, the third phase bridge arm 133, the primary coil T0, the first secondary coil T1, the seventh power switch Q7, the eighth power switch Q8, the ninth power switch Q9, the tenth power switch Q10, and the external battery 3 form a DC charging circuit, where the seventh power switch Q7, the eighth power switch Q8, the ninth power switch Q9, and the tenth power switch Q10 form a full-bridge rectification circuit. By using the full-bridge rectification circuit, a high-frequency AC outputted by the first secondary coil T1 is rectified into a DC, and a DC voltage with high-frequency energy is outputted, to charge the external battery 3.

It should be noted that, in this embodiment of this application, a plurality of power switches in the first bidirectional H-bridge 15 may be implemented by using a device that is connected in parallel to a diode and may perform a switch action, for example, a switch device such as a power triode, an MOSFET, and an IGBT.

Figure 9:
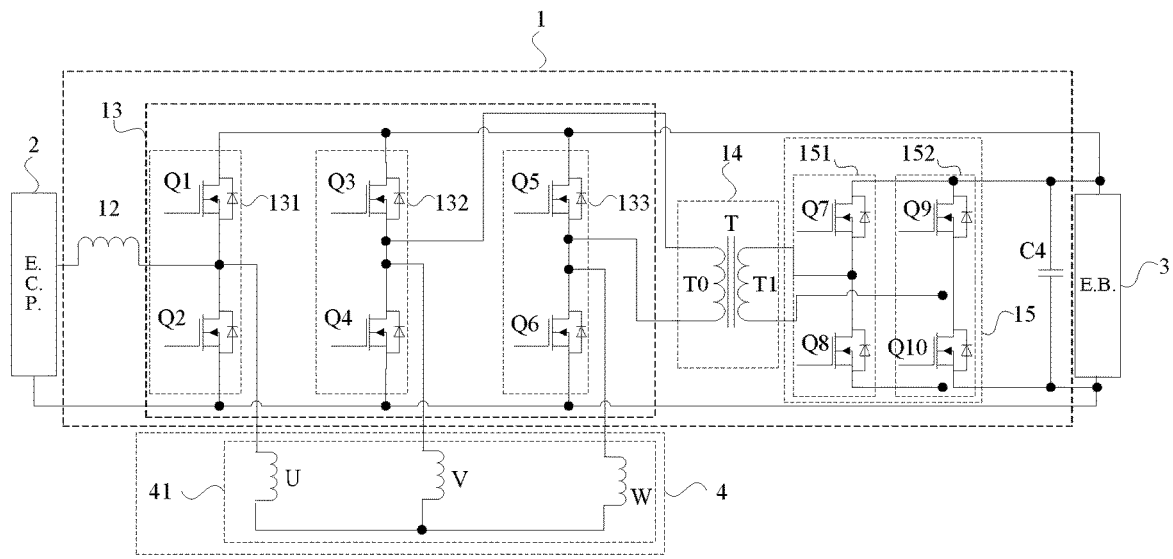
FIG. 9 is a schematic diagram of another circuit structure of the apparatus according to the fourth embodiment of this application.

In an implementation of this application, as shown in FIG. 9, the energy conversion apparatus 1 further includes a fourth capacitor C4.

In this embodiment, the external charging port 2, the inductor 12, the first phase bridge arm 131, the second phase bridge arm 132, the third phase bridge arm 133, the primary coil T0, the first secondary coil T1, the seventh power switch Q7, the eighth power switch Q8, the ninth power switch Q9, the tenth power switch Q10, the fourth capacitor C4, and the external battery 3 form a DC charging circuit, and a voltage outputted by the first bidirectional H-bridge 15 is filtered by using the fourth capacitor C4, to charge the external battery 3.

In this implementation, by using the voltage transformation unit 14 including the primary coil T0 and the first secondary coil T1, the inputted high-frequency AC may be converted into another high-frequency AC for output in a formed DC charging loop, and circuits on two sides of the voltage transformation unit 14 are isolated, thereby avoiding electrostatic interference between the circuits on the two sides. In addition, in the DC charging loop, the second phase bridge arm 132 and the third phase bridge arm 133 are reused, and the DC is converted into the AC, thereby simplifying a circuit structure, reducing a volume, and reducing costs.

Figure 10:
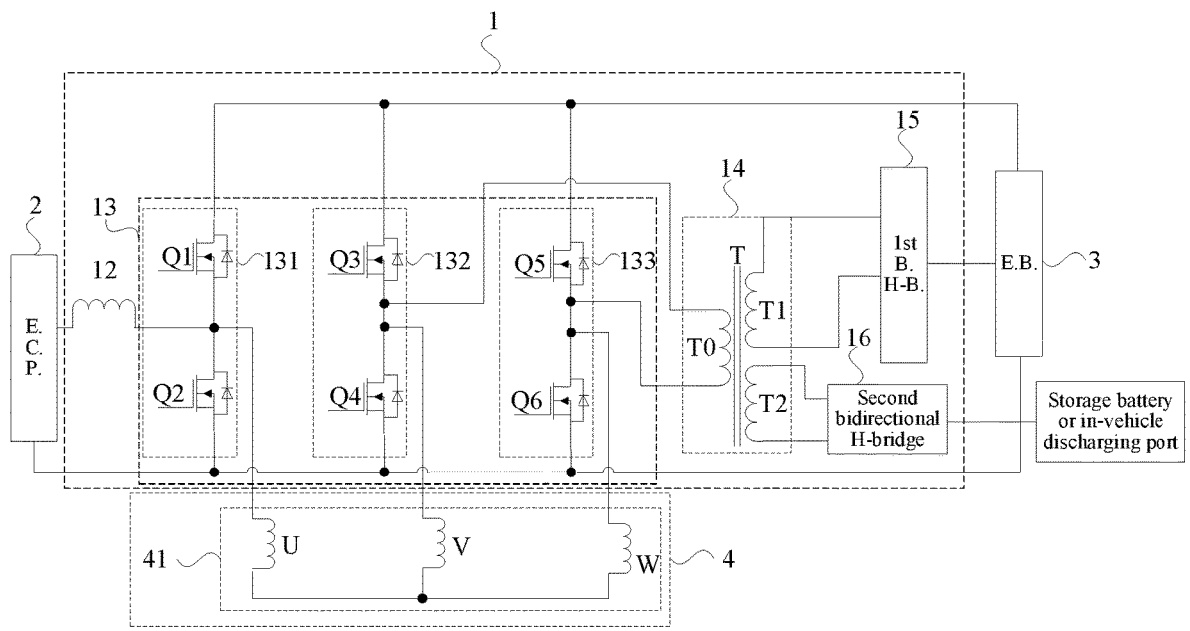
FIG. 10 is a schematic diagram of a circuit structure of an apparatus according to a fifth embodiment of this application.

In another embodiment of this application, in an implementation of this application, as shown in FIG. 10, the voltage transformation unit 14 in the energy conversion apparatus 1 further includes a second secondary coil T2.

Specifically, the second secondary coil T2 is connected to a storage battery or an in-vehicle discharging port by a second bidirectional H-bridge 16. When the storage battery is charged, the external charging port 2, the inductor 12, the bridge arm converter 13, the voltage transformation unit 14, and the second bidirectional H-bridge 16 form a charging circuit for the storage battery. When the external charging port 2 is connected to a charging device and the in-vehicle discharging port is connected to an electricity consumption device, the external charging port 2, the inductor 12, the bridge arm converter 13, the voltage transformation unit 14, and the second bidirectional H-bridge 16 form a charging circuit for the electricity consumption device. When the external charging port 2 is not connected to the charging device and the in-vehicle discharging port is connected to the electricity consumption device, the external battery 3, the first bidirectional H-bridge 15, the voltage transformation unit 14, and the second bidirectional H-bridge 16 form a discharging circuit for the electricity consumption device.

In this embodiment, by using the voltage transformation unit 14 including the primary coil T0, the first secondary coil T1, and the second secondary coil T2, when the energy conversion apparatus 1 works, a storage battery charging loop or an in-vehicle discharging port loop may be formed by the external charging port 2, the inductor 12, the bridge arm converter 13, the primary coil T0, the second secondary coil T2, the second bidirectional H-bridge 16, and the storage battery or the in-vehicle discharging port, so that the DC charging loop, and the storage battery charging loop or the in-vehicle discharging port loop do not interfere with each other during working, thereby improving the circuit reliability, and the external battery 3 may discharge to the electricity consumption device connected to the in-vehicle discharging port, thereby increasing functions of an overall control circuit.

Figure 11:
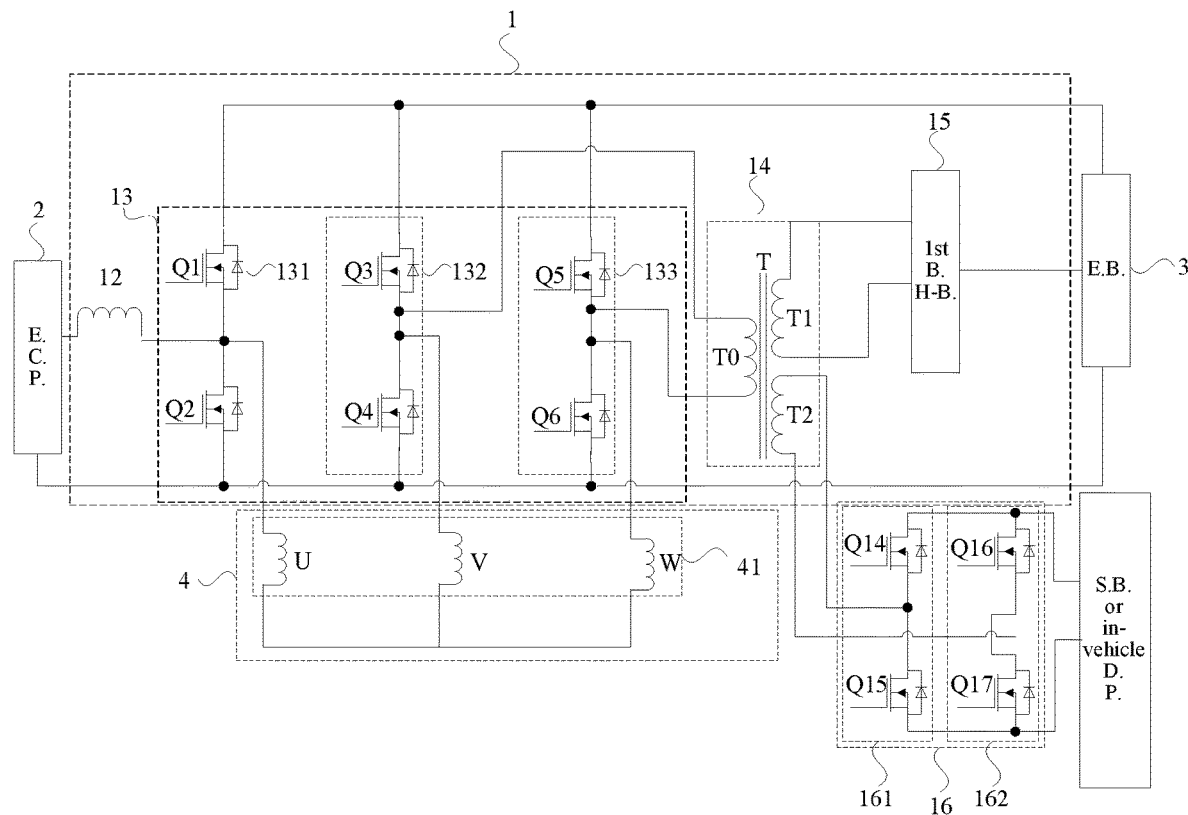
FIG. 11 is a schematic diagram of another circuit structure of the apparatus according to the fifth embodiment of this application.

In another embodiment of this application, in an implementation of this application, as shown in FIG. 11, the second bidirectional H-bridge 16 in the energy conversion apparatus 1 includes a ninth phase bridge arm 161 and a tenth phase bridge arm 162.

Specifically, the ninth phase bridge arm 161 includes a thirteenth power switch Q13 and a fourteenth power switch Q14 connected in series, and the tenth phase bridge arm 162 includes a fifteenth power switch Q15 and a sixteenth power switch Q16 connected in series.

A seventh midpoint between the thirteenth power switch Q13 and the fourteenth power switch Q14 is connected to an end of the second secondary coil T2, an eighth midpoint between the fifteenth power switch Q15 and the sixteenth power switch Q16 is connected to the other end of the second secondary coil T2, a first end of the thirteenth power switch Q13 and a first end of the fourteenth power switch Q14 are connected together to form a fifth confluence end of the second bidirectional H-bridge 16, a second end of the fourteenth power switch Q14 and a second end of the sixteenth power switch Q16 are connected together to form a sixth confluence end of the second bidirectional H-bridge 16, the fifth confluence end is connected to an end of the storage battery or the in-vehicle discharging port, and the sixth confluence end is connected to the other end of the storage battery or the in-vehicle discharging port.

In this implementation, in the storage battery charging loop or the in-vehicle discharging port loop formed by the external charging port 2, the inductor 12, the bridge arm converter 13, the primary coil T0, the second secondary coil T2, the second bidirectional H-bridge 16, and the storage battery or the in-vehicle discharging port, by using the second bidirectional H-bridge 16 formed by the ninth phase bridge arm 161 and the tenth phase bridge arm 162, an AC outputted by the second secondary coil T2 may be converted into a DC, to charge the storage battery or the in-vehicle discharging port.

It should be noted that, in this embodiment of this application, a plurality of power switches in the second bidirectional H-bridge 16 may be implemented by using a device that is connected in parallel to a diode and may perform a switch action, for example, a switch device such as a power triode, an MOSFET, and an IGBT.

Figure 12:
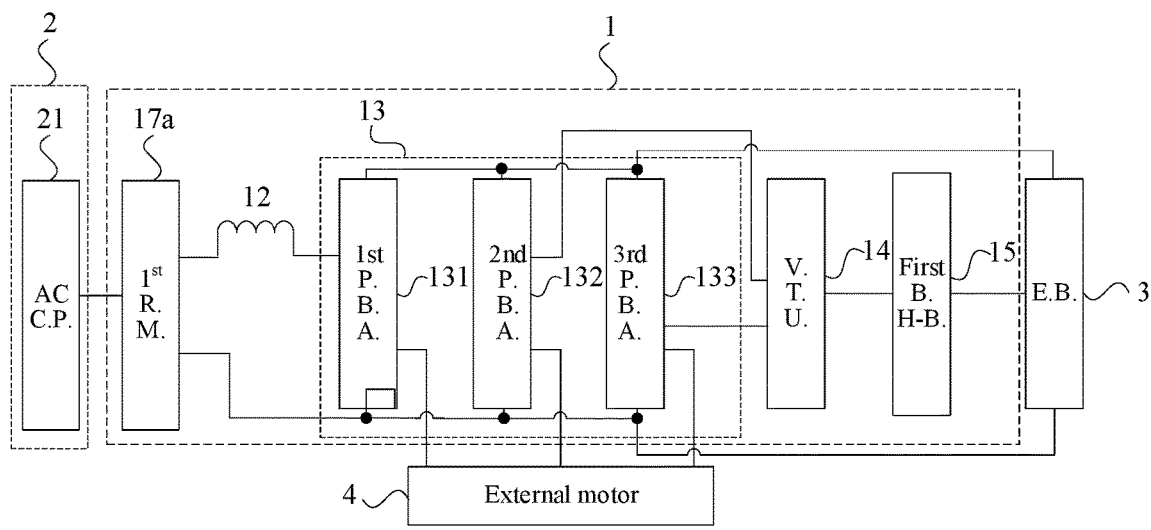
FIG. 12 is a schematic diagram of a circuit structure of an apparatus according to a sixth embodiment of this application.

In another embodiment of this application, in an implementation of this application, as shown in FIG. 12, when the external charging port 2 is an AC charging port 21, the energy conversion apparatus 1 further includes a first rectification module 17a.

Figure 13:
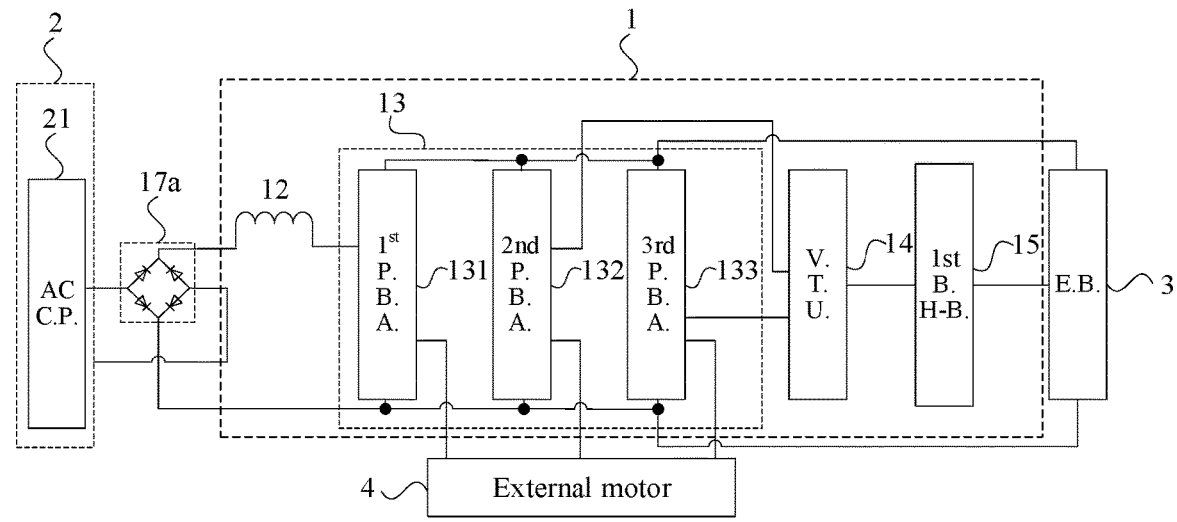
FIG. 13 is a schematic diagram of another circuit structure of the apparatus according to the sixth embodiment of this application.

Specifically, the first rectification module 17a is respectively connected to the AC charging port 21, the inductor 12, and the bridge arm converter 13. As shown in FIG. 13, the first rectification module 17a may include a rectification bridge, a first input end and a second input end of the rectification bridge are respectively connected to the AC charging port 21, an output end of the rectification bridge is connected to the inductor 12, and the other output end of the rectification bridge is connected to the bridge arm converter 13.

In this embodiment, the AC charging port 21, the first rectification module 17a, the inductor 12, the bridge arm converter 13, the voltage transformation unit 14, the first bidirectional H-bridge 15, and the external battery 3 form an AC charging circuit, or the AC charging port 21, the first rectification module 17a, the inductor 12, the first phase bridge arm 131, and the external battery 3 form an AC charging circuit. In the foregoing AC charging circuit, the first rectification module 17a rectifies an AC inputted by the AC charging port 21 into a DC for charging the external battery 3.

In this embodiment, the external battery 3, the first bidirectional H-bridge 15, the voltage transformation unit 14, the bridge arm converter 13, the inductor 12, the first rectification module 17a, and the AC charging port 21 form an AC discharging circuit, or the external battery 3, the first phase bridge arm 131, the inductor 12, the first rectification module 17a, and the AC charging port 21 form an AC discharging circuit. In the foregoing AC discharging circuit, by switching a power switch in the first rectification module 17a, the DC is converted into the AC, for the AC charging port 21 to discharge.

Figure 14:
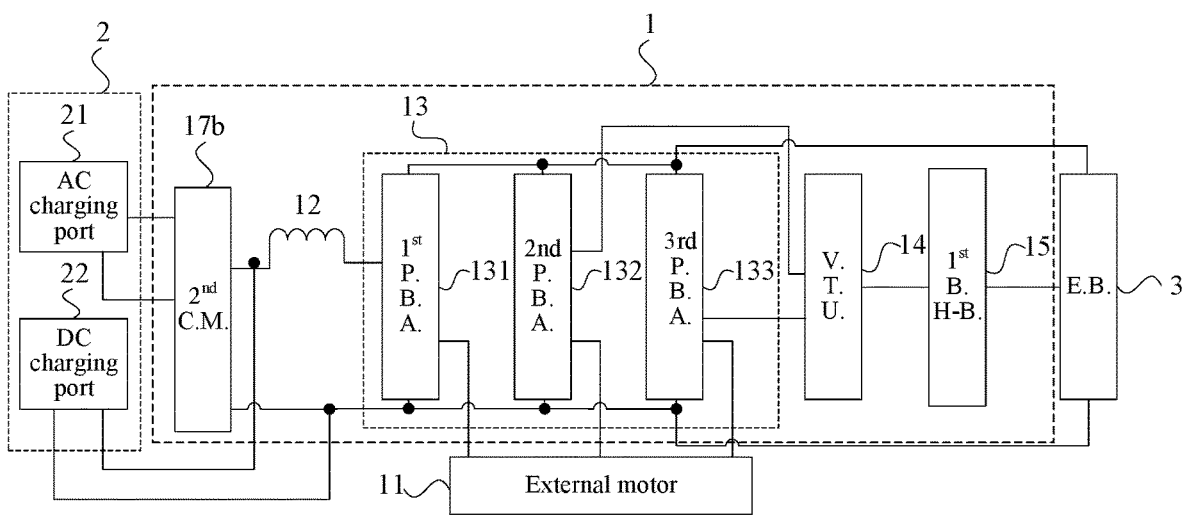
FIG. 14 is a schematic diagram of still another circuit structure of the apparatus according to the sixth embodiment of this application.

In another embodiment of this application, in an implementation of this application, as shown in FIG. 14, the external charging port 2 is an AC charging port 21 and a DC charging port 22, and the energy conversion apparatus 1 further includes a second rectification module 17b.

Specifically, the second rectification module 17b is respectively connected to the AC charging port 21, the inductor 12, and the bridge arm converter 13.

In this implementation, the AC charging port 21, the second rectification module 17b, the inductor 12, the bridge arm converter 13, the voltage transformation unit 14, the first bidirectional H-bridge 15, and the external battery 3 form an AC charging circuit, or the AC charging port 21, the second rectification module 17b, the inductor 12, the first phase bridge arm 131, and the external battery 3 form an AC charging circuit. In the foregoing AC charging circuit, the second rectification module 17b rectifies an AC inputted by the AC charging port 21 into a DC for charging the external battery 3.

In this embodiment, the external battery 3, the first bidirectional H-bridge 15, the voltage transformation unit 14, the bridge arm converter 13, the inductor 12, the second rectification module 17b, and the AC charging port 21 form an AC discharging circuit, or the external battery 3, the first phase bridge arm 131, the inductor 12, the second rectification module 17b, and the AC charging port 21 form an AC discharging circuit. In the foregoing AC discharging circuit, by switching a power switch in the second rectification module 17b, the DC is converted into the AC, for the AC charging port 21 to discharge.

In this implementation, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm 131, and the external battery 3 form a DC charging circuit.

In this embodiment, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

Figure 15:
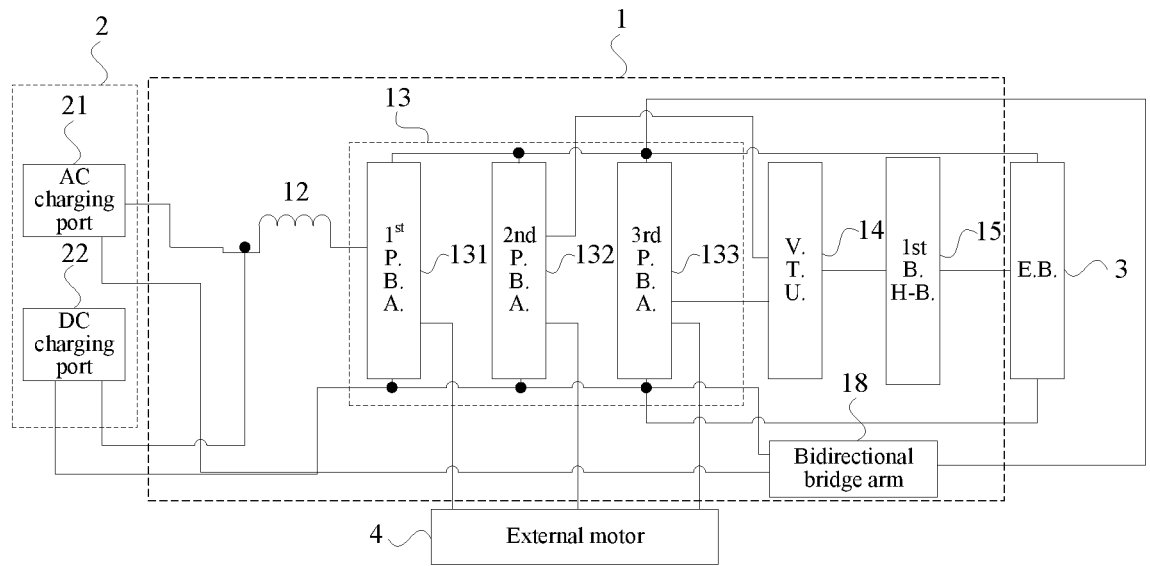
FIG. 15 is a schematic diagram of a circuit structure of an apparatus according to a seventh embodiment of this application.

In another embodiment of this application, in an implementation of this application, as shown in FIG. 15, when the external charging port 2 is an AC charging port 21 and a DC charging port 22, the energy conversion apparatus 1 further includes a bidirectional bridge arm 8.

Specifically, the bidirectional bridge arm 18 is respectively connected to the AC charging port 21 and the bridge arm converter 13.

In this embodiment, the AC charging port 21, the inductor 12, the bridge arm converter 13, the bidirectional bridge arm 18, the voltage transformation unit 14, the first bidirectional H-bridge 15, and the external battery 3 form an AC charging circuit. In the energy conversion apparatus 1, the bidirectional bridge arm 18 cooperates with the first phase bridge arm 131 to form a bidirectional H-bridge, which converts the AC into the DC, and the DC is then converted into the AC by using the second phase bridge arm 132 and the third phase bridge arm 133, so that the voltage transformation unit 14 receives a high-frequency AC, and then rectifies the high-frequency AC into the DC through the first bidirectional H-bridge, to charge the external battery 3.

In this embodiment, the external battery 3, the first bidirectional H-bridge, the voltage transformation unit 14, the bidirectional bridge arm 18, the bridge arm converter 13, the inductor 12, and the AC charging port 21 form an AC discharging circuit. In the AC discharging circuit, the bidirectional bridge arm 18 cooperates with the first phase bridge arm 131 to form a bidirectional H-bridge, which converts the DC into the AC, for the AC charging port 21 to discharge.

In addition, in this embodiment, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm 131, and the external battery 3 form a DC charging circuit.

In this embodiment, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

Figure 16:
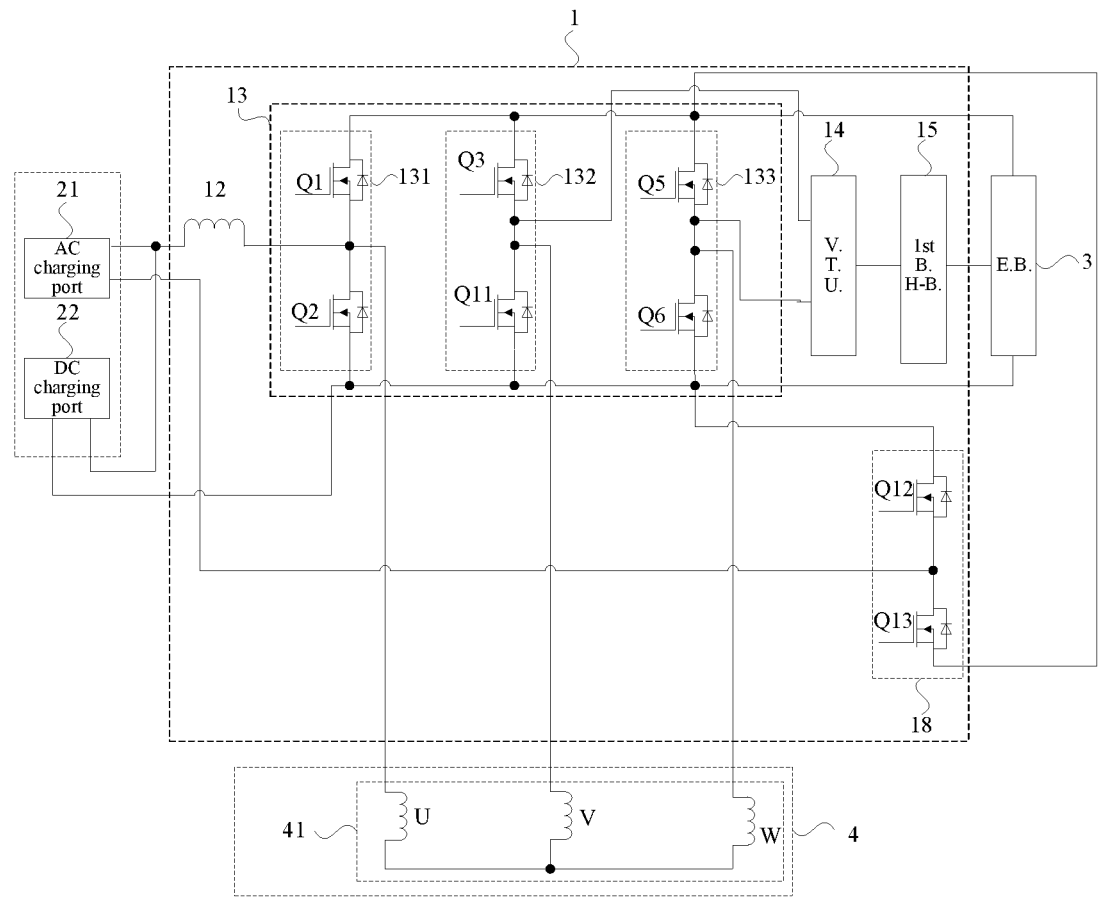
FIG. 16 is a schematic diagram of another circuit structure of the apparatus according to the seventh embodiment of this application.

In another embodiment of this application, in an implementation of this application, as shown in FIG. 16, the bidirectional bridge arm 18 in the energy conversion apparatus 1 includes an eleventh power switch Q11 and a twelfth power switch Q12 connected in series.

Specifically, a sixth midpoint between the eleventh power switch Q11 and the twelfth power switch Q12 is connected to the AC charging port 21, a first end of the eleventh power switch Q11 is connected to a first confluence end of the bridge arm converter 13, and a second end of the twelfth power switch Q12 is connected to a second confluence end of the bridge arm converter 13.

In this embodiment, the AC charging port 21, the inductor 12, the bridge arm converter 13, the eleventh power switch Q11, the twelfth power switch Q12, the voltage transformation unit 14, the first bidirectional H-bridge 15, and the external battery 3 form an AC charging circuit. In the energy conversion apparatus 1, the eleventh power switch Q11 and the twelfth power switch Q12 may cooperate with the first power switch Q1 and the second power switch Q2 in the first phase bridge arm 131 to form a bidirectional H-bridge, which converts the AC into the DC.

In another embodiment of this application, household power strips are generally used during AC charging, and a power of a common AC power supply is generally 7 kilowatts (kW). However, professional charging piles whose power is generally 60 kW to 150 kW are generally used during DC charging, and fast DC charging piles whose power is greater than 100 kW are a development trend. In addition, a power is generally about 100 kW during motor drive. Therefore, it can be learned from the foregoing description that power levels of a vehicle in the three cases of the motor drive, the DC charging, and the AC charging have a very large difference, but the power difference is very important for power switch selection.

In this embodiment, types of the power switches in the bridge arm converter 13 and types of the power switches in the bidirectional bridge arm 18 may be the same, or may be different. Specifically, a high-power power switch is more expensive than a low-power power switch. Therefore, based on consideration of different powers required when the energy conversion apparatus 1 works in the motor drive mode, the DC charging mode, and the AC charging mode, the types of the power switches in the bridge arm converter 13 and the types of the power switches in the bidirectional bridge arm 18 may be different. That is, power switches of different power levels (for example, an MOSFET power switch of a high-current level and an MOSFET power switch of a low-current level) or different types of switches (for example, a high-power IGBT power switch and a low-power MOSFET power switch) may be used in the bidirectional bridge arm 18 and the bridge arm converter 13. Specifically, in this embodiment, because the bridge arm converter 13 is used in all high-power modes such as the DC charging mode and the motor drive mode, the bridge arm converter 13 in this embodiment is implemented by using the high-power IGBT power switch, or is implemented by using the MOSFET power switch of the high-current level. However, because the bidirectional bridge arm 18 mainly works in the AC charging mode, the bidirectional bridge arm 18 may be implemented by using the low-power MOSFET, thereby reducing circuit costs while ensuring the effective working of the energy conversion apparatus 1.

On the other hand, because the bidirectional bridge arm 18 requires a relatively high switching frequency (for example, 60 kHz) during AC charging, it is necessary to use a MOSFET power switch that may achieve relatively high efficiency during high-frequency working or a silicon carbide MOSFET power switch. However, because the bridge arm converter 13 has three phase bridge arms, and has a working manner of three-phase interleaved control, the power switches of the bridge arm converter 13 require a relatively low frequency. Therefore, the types of the power switches in the bridge arm converter 13 and the types of the power switches in the bidirectional bridge arm 18 may be different.

Figure 17:
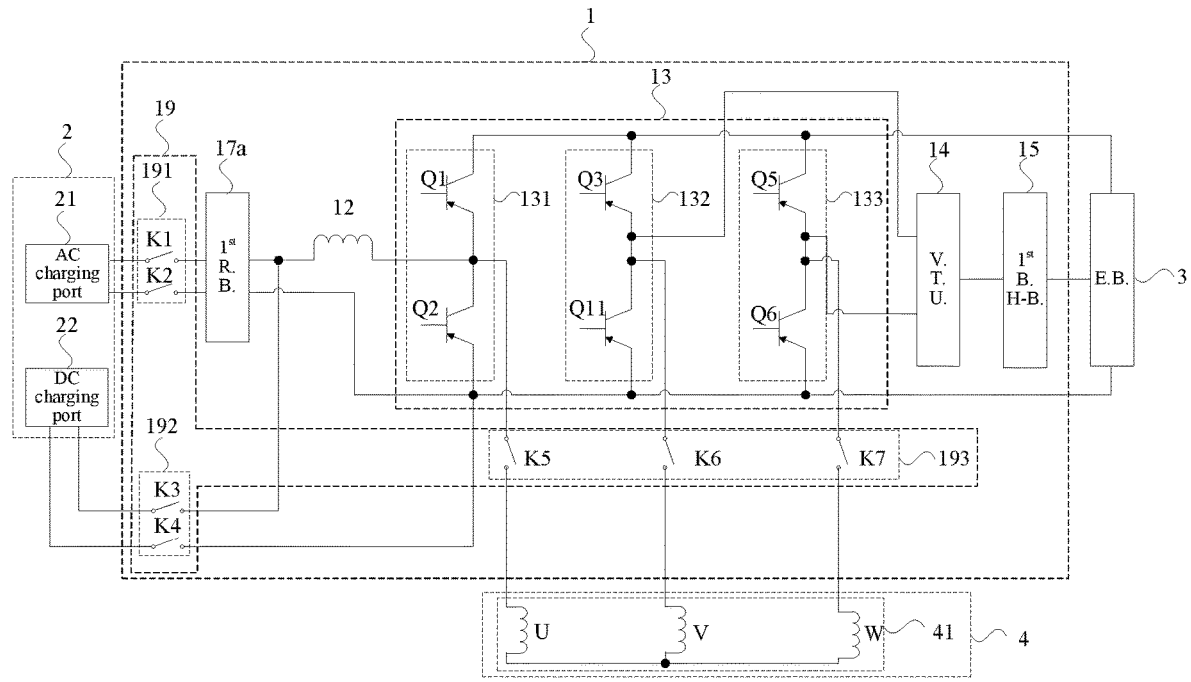
FIG. 17 is a schematic diagram of a circuit structure of an apparatus according to an eighth embodiment of this application.

In another embodiment of this application, in an implementation of this application, as shown in FIG. 17, the energy conversion apparatus 1 further includes a switch module 19.

Specifically, the switch module 19 includes a first switch unit 191, a second switch unit 192, and a third switch unit 193, where the first switch unit 191 is disposed between the AC charging port 21 and the first rectification module 17*a*, the second switch unit 192 is disposed between the DC charging port 22 and the bridge arm converter 13, and the third switch unit 193 is disposed between the motor coil 41 and the bridge arm converter 13.

In another embodiment of this application, the first switch unit 191 includes a switch K1 and a switch K2, where an end of the switch K1 is connected to the AC charging port 21, the other end of the switch K1 is connected to the first rectification module 17*a*, an end of the switch K2 is connected to the AC charging port 21, and the other end of the switch K2 is connected to the first rectification module 17*a*. The second switch unit 192 includes a switch K3 and a switch K4, where an end of the switch K3 is connected to the DC charging port 22, the other end of the switch K3 is connected to the inductor 12, an end of the switch K4 is connected to the DC charging port 22, and the other end of the switch K4 is connected to the first phase bridge arm 131. The third switch unit 193 includes a switch K5, a switch K6, and a switch K7, where an end of the switch K5 is connected to the first midpoint, and the other end of the switch K5 is connected to the first phase coil, an end of the switch K6 is connected to the second midpoint, and the other end of the switch K6 is connected to the second phase coil, an end of the switch K7 is connected to the third midpoint, and the other end of the switch K7 is connected to the third phase coil.

It should be noted that, in this embodiment, in the AC, charging circuit formed by the AC charging port 21, the first rectification module 17*a*, the inductor 12, the bridge arm converter 13, the voltage transformation unit 14, the first bidirectional H-bridge 15, and the external battery 3, the first rectification module 17*a* may use the same circuit structure as that of the second rectification module 17*b*, or may use another circuit having a rectification function.

In this embodiment, when the switch K1 and the switch K2 in the first switch unit 191 are turned on, the switch K3 and the switch K4 in the second switch unit 192 are turned off, and the switch K5, the switch K6, and the switch K7 in the third switch unit 193 are turned off, the AC charging port 21, the first rectification module 17*a*, the inductor 12, the bridge arm converter 13, the voltage transformation unit 14, the first bidirectional H-bridge 15, and the external battery 3 form an AC charging circuit.

In this embodiment, when the switch K1 and the switch K2 in the first switch unit 191 are turned off, the switch K3 and the switch K4 in the second switch unit 192 are turned on, and the switch K5, the switch K6, and the switch K7 in the third switch unit 193 are turned off, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm 131, and the external battery 3 form a DC charging circuit.

In this embodiment, when the switch K1 and the switch K2 in the first switch unit 191 are turned off, the switch K3 and the switch K4 in the second switch unit 192 are turned off, and the switch K5, the switch K6, and the switch K7 in the third switch unit 193 are turned on, the external battery 3, the bridge arm converter 13, and the external motor 4 form a motor drive circuit.

It should be noted that, in the energy conversion apparatus 1, a contactor switch is disposed between the external battery 3 and the bridge arm converter 13. When the contactor switch is in a closed state, the external battery 3, the bridge arm converter, and the external motor 4 form a motor drive circuit.

Figure 18:
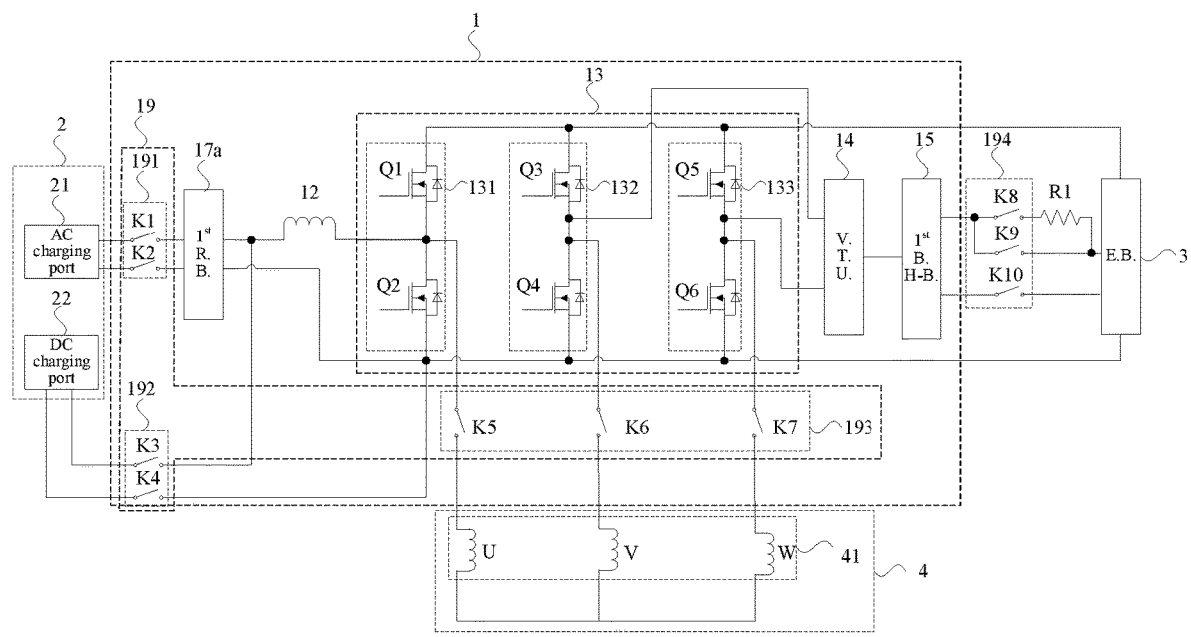
FIG. 18 is a schematic diagram of another circuit structure of the apparatus according to the eighth embodiment of this application.

In another embodiment of this application, in an implementation of this application, as shown in FIG. 18, the energy conversion apparatus 1 further includes a resistor R1, and the switch module 19 in the energy conversion apparatus 1 further includes a fourth switch unit 194.

Specifically, the fourth switch unit 194 includes a switch K8, a switch K9, and a switch K10. An end of the switch K8 and an end of the switch K9 are connected to the first bidirectional H-bridge 15, the other end of the switch K8 is connected to an end of the resistor R1, and the other end of the switch K9 and the other end of the resistor R1 are connected to an end of the external battery 3, an end of the switch K10 is connected to the first bidirectional H-bridge 15, and the other end of the switch K10 is connected to the other end of the external battery 3. In another embodiment of this application, an end of the switch K8 and an end of the switch K9 are connected to the third confluence end of the first bidirectional H-bridge 15, and an end of the switch K10 is connected to the fourth confluence end of the first bidirectional H-bridge 15.

In this embodiment, the switch K8 and the resistor R1 in the energy conversion apparatus 1 form a pre-charging module. When the switch K1 and the switch K2 in the first switch unit 191 are turned on, the switch K3 and the switch K4 in the second switch unit 192 are turned off, and the switch K5, the switch K6, and the switch K7 in the third switch unit 193 are turned off, or the switch K1 and the switch K2 in the first switch unit 191 are turned off, the switch K3 and the switch K4 in the second switch unit 192 are turned on, and the switch K5, the switch K6, and the switch K7 in the third switch unit 193 are turned off, the switch K8 is turned on, and after pre-charging is performed through R1, the switch K9 and the switch K10 are turned on. The pre-charging is performed through R1, to prevent the switch K9 and the switch K10 from failing, thereby reducing a failure rate of the energy conversion apparatus 1.

In this embodiment, in the energy conversion apparatus 1, by controlling an on state and an off state of each switch unit in the switch module 19, a working mode of the energy conversion apparatus 1 can be switched.

Figure 19:
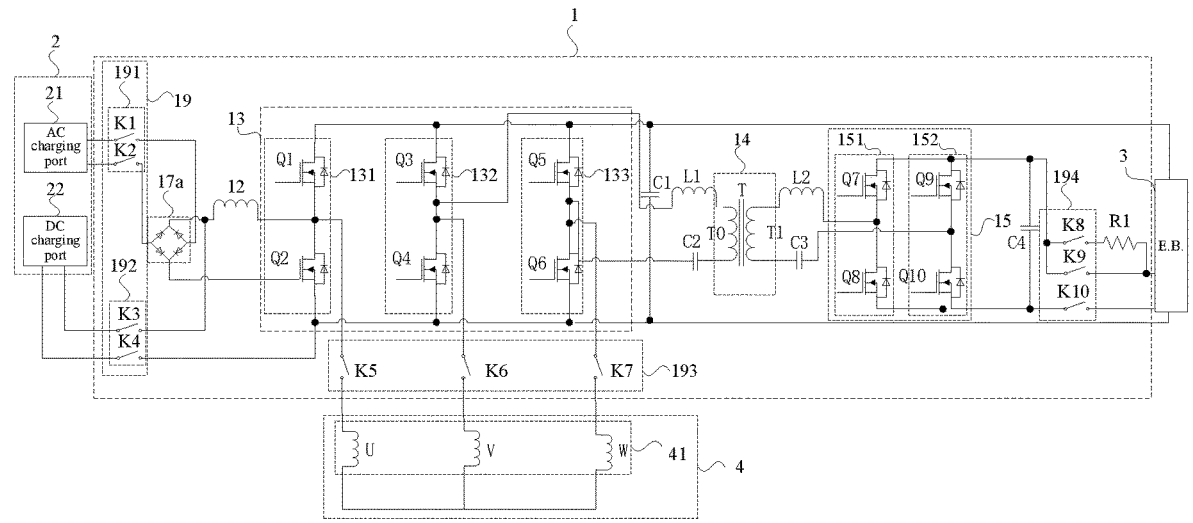
FIG. 19 is a schematic diagram of a working principle of an apparatus according to an embodiment of this application.

To better understand the content of this application, the following specifically describes, by using the energy conversion apparatus 1 shown in FIG. 19 as an example, the working principle of the energy conversion apparatus 1 provided in this application, and details are as follows:

Specifically, as shown in FIG. 19, when the energy conversion apparatus 1 performs AC charging, the switch K1 and the switch K2 are turned on, the switch K3, the switch K4, the switch K5, the switch K6, and the switch K7 are turned off, the contactor switch between the external battery 3 and the bridge arm converter 13 is turned off, pre-charging is completed through the switch K8 and the resistor R1, and the switch K9 and the switch K10 are turned on. In this case, the AC charging port 21 inputs an AC, the first rectification module 17a rectifies the AC and outputs a DC, PFC is completed by using the inductor 12, the first power switch Q1, and the second power switch Q2, and DC-AC conversion is implemented by using the third power switch Q3, the fourth power switch Q4, the fifth power switch Q5 and the sixth power switch Q6. The third power switch Q3 and the fourth power switch Q4 output high-frequency AC positive waves, the fifth power switch Q5 and the sixth power switch Q6 output high-frequency AC negative waves, and the voltage transformation unit 14 and the first bidirectional H-bridge 15 perform voltage transformation and rectification processing on the high-frequency AC outputted by the bridge arm converter 13, to implement AC-DC conversion. A DC voltage is outputted, and the fourth capacitor C4 filters the DC voltage to charge the external battery 3.

In some embodiments, as shown in FIG. 19, when the energy conversion apparatus 1 performs AC charging, the switch K1 and the switch K2 are turned on, the switch K3, the switch K4, the switch K5, the switch K6, and the switch K7 are turned off, the contactor switch between the external battery 3 and the bridge arm converter 13 is turned on, pre-charging is completed through the switch K8 and the resistor R1, and the switch K9 and the switch K10 are turned on. In this case, the AC charging port 21 inputs an AC, the first rectification module 17a rectifies the AC and outputs a DC, PFC is completed by using the inductor 12, the first power switch Q1, and the second power switch Q2, and the DC is rectified by using the first power switch Q1, and is filtered by using the first capacitor C1 to output a DC voltage to charge the external battery 3.

In this embodiment, in the energy conversion apparatus 1 provided in this application, by controlling each switch to be turned on or off, the AC received by the AC charging port 21 performs AC charging to the external battery 3 after passing through the first rectification module 17a, the inductor 12, the bridge arm converter 13, the first capacitor C1, the voltage transformation unit 14, the first bidirectional H-bridge 15, and the fourth capacitor C4, and AC charging manners are not limited to one manner. That is, the AC charging manners of the energy conversion apparatus 1 are multi-solution redundant, and the working voltage may be self-adjusted, so that the AC charging function of the energy conversion apparatus 1 can be effectively ensured while improving the charging efficiency.

In another embodiment of this application, as shown in FIG. 19, when the energy conversion apparatus 1 performs DC charging, the switch K3 and the switch K4 are turned on, the switch K1, the switch K2, the switch K5, the switch K6, and the switch K7 are turned off, the contactor switch between the external battery 3 and the bridge arm converter 13 is turned off, the contactor switch between external battery 3 and bridge arm converter 13 is turned off, pre-charging is completed by using the switch K8 and the resistor R1, and the switch K9 and the switch K10 are turned on. In this case, the DC charging port 22 outputs the DC, the PFC is completed by using the inductor 12, the first power switch Q1, and the second power switch Q2, and DC-AC conversion is implemented by using the third power switch Q3, the fourth power switch Q4, the fifth power switch Q5, and the sixth power switch Q6. The third power switch Q3 and the fourth power switch Q4 output high-frequency AC positive waves, the fifth power switch Q5 and the sixth power switch Q6 output high-frequency AC negative waves, and the voltage transformation unit 14 and the first bidirectional H-bridge 15 perform voltage transformation and rectification processing on the high-frequency AC outputted by the bridge arm converter 13, to implement AC-DC conversion. A DC voltage is outputted, and the fourth capacitor C4 filters the DC voltage to charge the external battery 3.

In some embodiments, as shown in FIG. 19, when the energy conversion apparatus 1 performs DC charging, the switch K3 and the switch K4 are turned on, the switch K1, the switch K2, the switch K5, the switch K6, and the switch K7 are turned off, the contactor switch between the external battery 3 and the bridge arm converter 13 is turned on, pre-charging is completed by using the switch K8 and the resistor R1, and the switch K9 and the switch K10 are turned on. In this case, the DC charging port 22 outputs a DC, the PFC is completed by using the inductor 12, the first power switch Q1, and the second power switch Q2, and the DC is rectified by using the first power switch Q1 and is filtered by using the first capacitor C1 to output a DC voltage to charge the external battery 3.

In another embodiment of this application, as shown in FIG. 19, when the energy conversion apparatus 1 works in the motor drive mode, the switch K5, the switch K6, and the switch K7 are turned on, the switch K1, the switch K2, the switch K3, the switch K4, the switch K8, the switch K9, and the switch K10 are turned off, and the contactor switch between the external battery 3 and the bridge arm converter 13 is turned on. In this case, the external battery 3 outputs a high-voltage DC. The high-voltage DC outputs a three-phase AC to a three-phase winding of the motor coil 41 through a three-phase motor drive bridge of the bridge arm converter 12 to drive the external motor 4.

Figure 20:
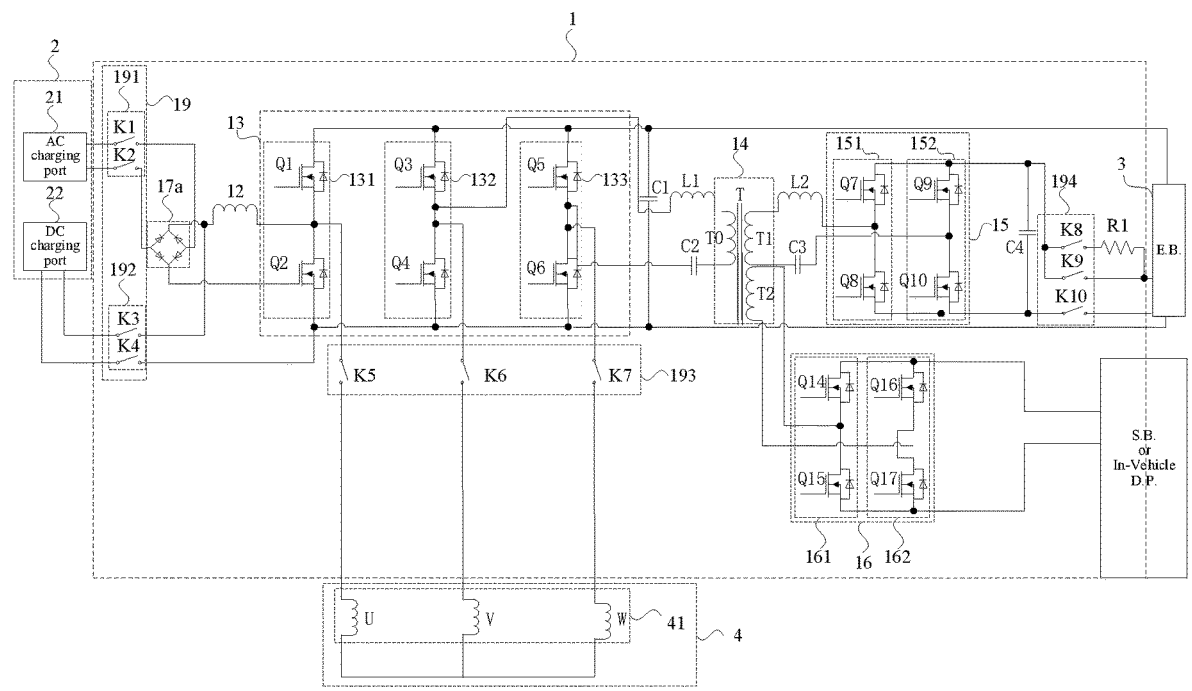
FIG. 20 is a schematic diagram of another working principle of an apparatus according to an embodiment of this application.

Further, as shown in FIG. 20, the voltage transformation unit 14 of the energy conversion apparatus 1 further includes a second secondary coil T2.

When the energy conversion apparatus 1 performs DC charging or AC charging, the external charging port 2, the inductor 12, the bridge arm converter 13, the voltage transformation unit 14, and the second bidirectional H-bridge 16 form a charging circuit for charging the storage battery or an electricity consumption device connected to the in-vehicle discharging port.

In another embodiment of this application, the energy conversion apparatus 1 may further work in a discharging mode. To better understand the working principle of this application, the following describes the working principle of this application by using the energy conversion apparatus 1 shown in FIG. 20 as an example.

Specifically, referring to FIG. 20, when the energy conversion apparatus 1 works in the AC discharging mode, the switch K1, the switch K2, the switch K9, and the switch K10 are turned on, and the switch K3, the switch K4, the switch K5, the switch K6, and the switch K7 are turned off, so that the high-voltage DC outputted by the external battery 3 discharges to the outside through the AC charging port 22 under the action of the first bidirectional H-bridge 15, the voltage transformation unit 14, the bridge arm converter 13, and the inductor 12.

In another embodiment of this application, referring to FIG. 20, when the energy conversion apparatus 1 works in the DC discharging mode, the switch K3, the switch K4, the switch K9, and the switch K10 are turned on, and the switch K1, the switch K2, the switch K5, the switch K6, and the switch K7 are turned off, so that the high-voltage DC outputted by the external battery 3 discharges to the outside through the DC charging port 22 under the action of the first bidirectional H-bridge 15, the voltage transformation unit 14, the bridge arm converter 13, and the inductor 12.

In another embodiment of this application, referring to FIG. 20, when the energy conversion apparatus 1 performs discharging by using the storage battery or the in-vehicle discharging port, the switch K1 and the switch K2 are turned on, the switch K3, the switch K4, the switch K5, the switch K6, the switch K7, the switch K8, the switch K9, and the switch K10 are turned off, and the AC charging port 21, the first rectification module 17a, the inductor 12, the bridge arm converter 13, the primary coil T0, the second secondary coil T2, the second bidirectional H-bridge 16, and the storage battery or the in-vehicle discharging port form an AC discharging circuit.

In some embodiments, the switch K3 and the switch K4 are turned on, the switch K1, the switch K2, the switch K5, the switch K6, the switch K7, the switch K8, the switch K9, and the switch K10 are turned off, and the DC charging port 22, the first rectification module 17a, the inductor 12, the bridge arm converter 13, the primary coil T0, the second secondary coil 12, the second bidirectional H-bridge 16, and the storage battery or the in-vehicle discharging port form a DC discharging circuit.

In some embodiments, the switch K9 and the switch K10 are turned on, the switch K1, the switch K2, the switch K3, the switch K4, the switch K5, the switch K6, the switch K7, and the switch K8 are turned off, and the external battery 3, the bridge arm converter 13, the primary coil T0, the second secondary coil T2, the second bidirectional H-bridge 16, and the storage battery or the in-vehicle discharging port form a discharging circuit of the external battery 3.

It should be noted that, in this embodiment, the principle of the AC discharging working mode of the energy conversion apparatus 1 is opposite to the principle of the AC charging working mode of the energy conversion apparatus. Therefore, for a specific working principle of the AC discharging working mode of the energy conversion apparatus 1, reference may be made to a specific working process of the AC charging mode of the energy conversion apparatus, and details are not described herein again.

In this embodiment, in the energy conversion apparatus 1 provided in this application, by integrating the inductor 12, the bridge arm converter 13, the voltage transformation unit 14, and the first bidirectional H-bridge 15 in one circuit, the drive of the external motor 4 can be implemented by using the bridge arm converter 13. A voltage outputted by the first phase bridge arm 131 is increased while PFC is implemented by using the cooperation between the first phase bridge arm 131 in the bridge arm converter 13 and the inductor 12. The DC may be converted into the AC by using the second phase bridge arm 132 and the third phase bridge arm 133 in the bridge arm converter 13, and AC charging and discharging and DC charging and discharging of the vehicle battery may be further performed by using the energy conversion apparatus 1. The bridge arm converter 13 is reused, thereby simplifying the circuit structure, improving the circuit integration, reducing the circuit costs, reducing the circuit volume, and achieving a simple circuit structure.

In addition, because the energy conversion apparatus 1 provided in this application may work in both the AC charging mode and the AC discharging mode, application scenarios of charging are increased, and an application scope is expanded.

Figure 21:
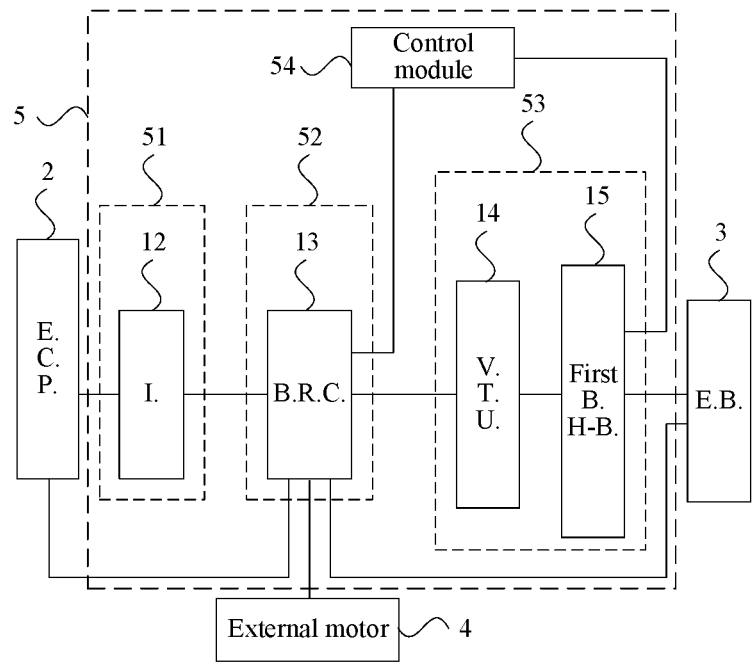
FIG. 21 is a schematic diagram of a module structure of a power system according to a ninth embodiment of this application.

As shown in FIG. 21, this application further provides a power system 5. The power system 5 includes an energy conversion apparatus 1 and a control module 54, where the energy conversion apparatus 1 includes an in-vehicle charging module 51, a motor control module 52, and a bidirectional DC/DC module 53.

The in-vehicle charging module 51 includes an inductor 12, and the inductor 12 is connected to an external charging port 2. The motor control module 52 includes a bridge arm converter 13, and the bridge arm converter 13 is respectively connected to the external charging port 2, the inductor 12, an external motor 4, and an external battery 3. The bidirectional DC/DC module 53 includes a voltage transformation unit 14 and a first bidirectional H-bridge 15. An end of the voltage transformation unit 14 is connected to the bridge arm converter 13, the other end of the voltage transformation unit 14 is connected to an end of the first bidirectional H-bridge 15, and the other end of the first bidirectional H-bridge 15 is connected to the external battery 3. The control module 54 is respectively connected to the bridge arm converter 13 and the first bidirectional H-bridge 15. The control module is configured to control a drive circuit formed by the external battery 3, the bridge arm converter 13 and the external motor 4 and is configured to control a charging circuit formed by the external charging port 2, the inductor 12, the bridge arm converter 13, the voltage transformation unit 14, the first bidirectional H-bridge 15, and the external battery 3.

In another embodiment of this application, the energy conversion apparatus 1 in the system 5 further includes a switch module 19, and the control module 54 is configured to control the switch module 19, to implement switching between a charging mode and a drive mode.

It should be noted that, for switch units in the switch module 19, reference may be made to FIG. 18 and FIG. 19. The control module 54 controls the switch units in the switch module 19 and power switches in the energy conversion apparatus 1 to switch a working mode of the energy conversion apparatus 1.

Specifically, when the energy conversion apparatus 1 works in the drive mode, the external battery 3 drives, by using the bridge arm converter 13, the external motor 4 to work. Specifically, the external battery 3 provides a DC to the bridge arm converter 13, the first phase bridge arm 131 in the bridge arm converter 13 converts the DC into a three-phase AC and inputs the three-phase AC to the external motor 4 to drive the external motor 4 to run, the external motor 4 outputs an AC, the AC is converted by using the second phase bridge arm 132 and the third phase bridge arm 133 in the bridge arm converter 13, and a DC is outputted, and is returned to the external battery 3.

In another embodiment of this application, when the energy conversion apparatus 1 works in the charging mode, specifically, in the charging mode, the external charging port 2, the inductor 12, the bridge arm converter 13, the voltage transformation unit 14, and the first bidirectional H-bridge 15 form a charging circuit for charging the external battery 3.

A power supply provided by the external charging port 2 is a DC power supply. When a power supply provided by the external charging port 2 is a DC power supply, the external charging port 2, the inductor 12, the bridge arm converter 13, the voltage transformation unit 14, the first bidirectional H-bridge 15, and the external battery 3 form a DC charging circuit. In this case, a DC outputted by the external charging port 2 is boosted through the inductor 12 and the first phase bridge arm 131 in the bridge arm converter 13, a DC is outputted, the DC outputted by the first phase bridge arm 131 is converted by using the second phase bridge arm 132 and the third phase bridge arm 133 in the bridge arm converter 13, an AC is outputted, the voltage transformation unit 14 converts a high-frequency AC and outputs another high-frequency AC, and the first bidirectional H-bridge 15 rectifies the high-frequency AC outputted by the voltage transformation unit 14 and outputs a DC for charging the external battery 3.

In some embodiments, the external charging port 2, the inductor 12, the first phase bridge arm 131, and the external battery 3 form a DC charging circuit. In this case, the DC outputted by the external charging port 2 is boosted through the inductor 12 and the first phase bridge arm 131 in the bridge arm converter 13, and a DC is outputted to charge the external battery 3.

In addition, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

It should be noted that, in this embodiment, the principle of the DC discharging working mode is opposite to the principle of the DC charging working mode. For a specific working principle of the DC discharging working mode, reference may be made to a specific working process of the DC charging mode, and details are not described herein again.

During specific implementation, the DC power supply or the AC power supply provides a DC or an AC to the power system 5 through the external charging port 2, and the DC power supply may be a DC obtained by rectifying an external AC power supply, or may be a DC outputted by an external charging pile, which is not specifically limited herein.

In this embodiment, by using the power system 5 including the energy conversion apparatus 1 and the control module 54, the power system 5 may work in the drive mode and the DC charging mode in a time-sharing manner, and motor drive and battery charging of a vehicle may be performed by using the same circuit structure. The circuit integration is high, and the circuit structure is simple, thereby reducing circuit costs, reducing a circuit volume, and resolving existing problems that an overall circuit of the motor drive and charging system has a complex structure, low integration, a large volume, and high costs.

In another embodiment of this application, in an implementation of this application, the energy conversion apparatus 1 in the power system 5 further includes a first rectification module 17a, and in this case, the external charging port 2 is an AC charging port 21.

Specifically, the first rectification module 17a is respectively connected to the AC charging port 21, the inductor 12, and the bridge arm converter 13. The control module 54 controls an on state and an off state of each switch in the switch module to implement switching between the AC charging mode and the drive mode. When the working mode is switched to the AC charging mode, the control module 54 is configured to control an AC charging circuit formed by the AC charging port 21, the first rectification module 17a, the inductor 12, the bridge arm converter 13, the voltage transformation unit 14, the first bidirectional H-bridge 15, and the external battery 3, or an AC charging circuit formed by the AC, charging port 21, the first rectification module 17a, the inductor 12, the first phase bridge arm 131, and the external battery 3. When the working mode is switched to the drive mode by using the control module 54, the external battery 3, the bridge arm converter 13, and the external motor 4 form a drive circuit.

In another embodiment of this application, the external battery 3, the first bidirectional H-bridge 15, the voltage transformation unit 14, the bridge arm converter 13, the inductor 12, the first rectification module 17a, and the AC charging port 21 form an AC discharging circuit, or the external battery 3, the first phase bridge arm 131, the inductor 12, the first rectification module 17a, and the AC charging port 21 form an AC discharging circuit. In the foregoing AC discharging circuit, by switching a power switch in the first rectification module 17a, the DC is converted into the AC, for the AC charging port 21 to discharge.

In this embodiment, the first rectification module 17a rectifies the AC outputted by the AC charging port 21 into the DC, to charge the external battery 3, or the first rectification module 17a converts the DC into the AC, for the AC charging port 21 to discharge.

In another embodiment of this application, in an implementation of this application, the energy conversion apparatus 1 in the power system 5 further includes a second rectification module, and in this case, the external charging port 2 is the AC charging port 21 and the DC charging port 22.

Specifically, the second rectification module is respectively connected to the AC charging port 21, the inductor 12, and the bridge arm converter 13, and the DC charging port 22 is respectively connected to the inductor 12 and the bridge arm converter 13. The control module 54 controls an on state and an off state of each switch in the switch module to implement switching among the AC charging mode, the DC charging mode, and the drive mode. When the working mode is switched to the AC charging mode, the AC charging port 21, the second rectification module 17b, the inductor 12, the bridge arm converter 13, the voltage transformation unit 14, the first bidirectional H-bridge 15, and the external battery 3 form an AC charging circuit, or the AC charging port 21, the second rectification module 17b, the inductor 12, the first phase bridge arm 131, and the external battery 3 form an AC charging circuit.

In another embodiment of this application, the external battery 3, the first bidirectional H-bridge 15, the voltage transformation unit 14, the bridge arm converter 13, the inductor 12, the second rectification module 17b, and the AC charging port 21 form an AC discharging circuit, or the external battery 3, the first phase bridge arm 131, the inductor 12, the second rectification module 17b, and the AC charging port 21 form an AC discharging circuit. In the foregoing AC discharging circuit, by switching a power switch in the second rectification module 17b, the DC is converted into the AC, for the AC charging port 21 to discharge.

When the working mode is switched to the DC charging mode, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm of the bridge arm converter 13, and the external battery 3 form a DC charging circuit.

In another embodiment of this application, the external batter 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

When the working mode is switched to the drive mode, the external battery 3, the bridge arm converter 13, and the external motor 4 form a drive circuit.

In this embodiment, the second rectification module 17b rectifies the AC outputted by the AC charging port 21 into the DC, to charge the external battery 3, or the second rectification module 17b converts the DC into the AC, for the AC charging port 21 to discharge.

In another embodiment of this application, in an implementation of this application, the energy conversion apparatus 1 in the power system 5 further includes a bidirectional bridge arm 18.

Specifically, the bidirectional bridge arm 18 is respectively connected to the external charging port 2 and the bridge arm converter 13. The control module 54 controls an on state and an off state of each switch in the switch module to implement switching among the AC charging mode, the DC charging mode, and the drive mode. When the working mode is switched to the AC charging mode, the AC charging port 21, the inductor 12, the bridge arm converter 13, the bidirectional bridge arm, the voltage transformation unit 14, the first bidirectional H-bridge 15, and the external battery 3 form an AC charging circuit.

In another embodiment of this application, the external battery 3, the first bidirectional H-bridge, the voltage transformation unit 14, the bidirectional bridge arm 18, the bridge arm converter 13, the inductor 12, and the AC charging port 21 form an AC discharging circuit. In the AC discharging circuit, the bidirectional bridge arm 18 cooperates with the first phase bridge arm 131 to form a bidirectional H-bridge, which converts the DC into the AC, for the AC charging port 21 to discharge.

When the working mode is switched to the DC charging mode, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm, and the external battery 3 form a DC charging circuit.

In another embodiment of this application, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

When the working mode is switched to the drive mode, the external battery 3, the bridge arm converter 13, and the external motor 4 form a drive circuit.

In this embodiment, the AC charging port 21, the inductor 12, the bridge arm converter 13, the bidirectional bridge arm 18, the voltage transformation unit 14, the first bidirectional H-bridge 15, and the external battery 3 form an AC charging circuit. In the energy conversion apparatus 1, the bidirectional bridge arm 18 cooperates with the first phase bridge arm in the bridge arm converter 13 to form a bidirectional H-bridge, the AC is converted into the DC, and the DC is then converted into the AC by using the second phase bridge arm and the third phase bridge arm in the bridge arm converter 13, so that the voltage transformation unit 14 receives a high-frequency AC, and the high-frequency AC is then rectified into the DC through the first bidirectional H-bridge 15, to charge the external battery 3.

Figure 22:
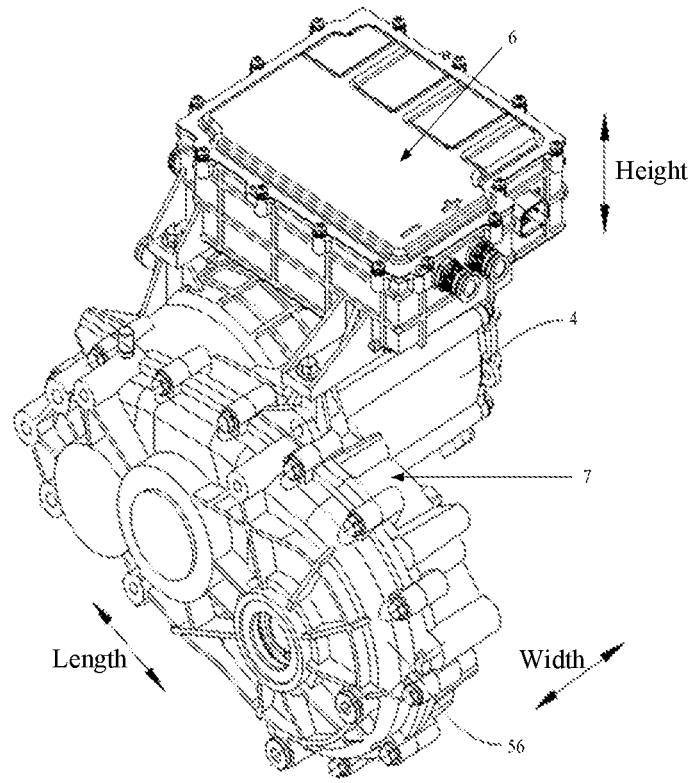
FIG. 22 is a schematic structural diagram of a power system according to a twelfth embodiment of this application.

In another embodiment of this application, in an implementation of this application, referring to FIG. 22, the in-vehicle charging module 51, the motor control module 52, and the bidirectional DC/DC module 53 are integrated in a first box 6. It should be noted that, in other embodiments of this application, the in-vehicle charging module 51, the motor control module 52, and the bidirectional DC/DC module 53 may be disposed in two or three boxes respectively. This is not specifically limited herein.

In another embodiment of this application, in an implementation of this application, the power system 5 further includes a first capacitor C1. The first capacitor C1 is connected in parallel to the motor control module 52, and the first capacitor is integrated in the first box 6.

During specific working, when the power system 5 works in the DC charging mode or the AC charging mode, in a DC charging process or an AC charging process of the external battery 3, the first capacitor C1 may store energy according to a voltage outputted by the motor control module 52 in addition to filtering the voltage outputted by the motor control module 52, to complete DC charging or AC charging of the external battery 3.

In this embodiment, the first capacitor is disposed in the power system 5, so that the first capacitor C1 may store energy according to a voltage outputted by the motor control module 52 or the motor control module 52 and the in-vehicle charging module 51 in addition to filtering the voltage outputted by the motor control module 52 or the motor control module 52 and the in-vehicle charging module 51, to complete DC charging or AC charging of the external battery 3, thereby ensuring a normal charging function of the power system 5, and also ensuring that other clutter does not interfere with the charging process.

In this embodiment, the in-vehicle charging module 51, the motor control module 52, and the bidirectional DC/DC module 53 are integrated in the first box 6, so that the overall structure of the power system 5 is more compact, and the volume of the power system 5 is further reduced, thereby reducing the weight of the vehicle to which the power system 5 is applied.

In another embodiment of this application, in an implementation of this application, as shown in FIG. 22, the power system 5 further includes a speed reducer 56. The speed reducer 56 is power-coupled to a motor, and the speed reducer 56 and the motor are integrated in a second box 7.

In another embodiment of this application, in an implementation of this application, the first box 6 is fixedly connected to the second box 7.

During specific implementation, the first box 6 and the second box 7 may be connected by any connecting member having a fixing function, or a fixing member that may be connected to the second box 7 is disposed on the first box 6, or a fixing member that may be connected to the first box 6 is disposed on the second box 7, which is not specifically limited herein.

In this embodiment, the first box 6 and the second box 7 are fixed, to effectively avoid the separation between the first box 6 and the second box 7, thereby ensuring that the in-vehicle charging module 51, the motor control module 52, the bidirectional DC/DC module 53, the external motor 4, and the speed reducer 56 do not have a failure due to the falling of the boxes, and improving the working reliability and stability of the power system 5.

It should be noted that, for detailed working principles and specific working processes of the energy conversion apparatus 1, the control module 54, and the switch module in the power system 5 in this embodiment, reference may be made to the foregoing detailed description of the energy conversion apparatus 1, and details are not described herein again.

In this application, in the vehicle provided in this application, by using the power system 5 including the in-vehicle charging module 51, the motor control module 52, and the bidirectional DC/DC module 53, when the power system 5 is applied, the vehicle may work in the drive mode, the DC charging mode, and the AC charging mode in a time-sharing manner, to implement motor drive and battery charging of the vehicle by using the same circuit structure. The circuit integration is high, and the circuit structure is simple, thereby reducing circuit costs, reducing a circuit volume, and resolving existing problems that an overall circuit of the motor drive and charging system has a complex structure, low integration, a large volume, and high costs.

Figure 23:
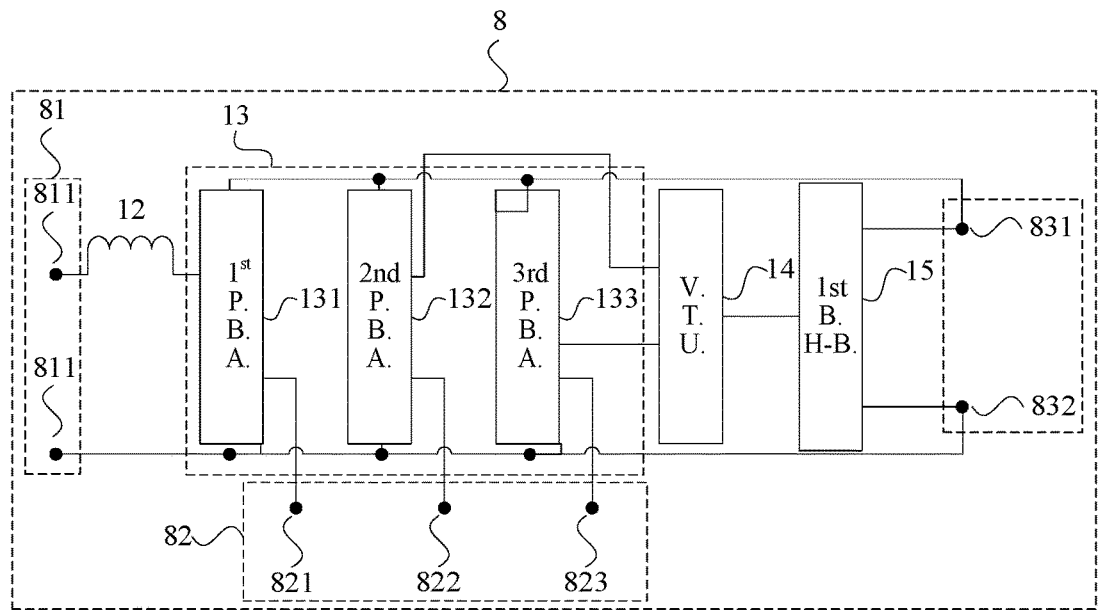
FIG. 23 is a schematic diagram of modules of an apparatus according to a thirteenth embodiment of this application.

As shown in FIG. 23, this application further provides an energy conversion apparatus 8. The energy conversion apparatus 8 includes a charging connection end group 81, a bridge arm converter 13, an inductor 12, a drive output connection end group 82, a voltage transformation unit 14, a first bidirectional H-bridge 15, and an energy storage connection end group 83.

Specifically, referring to FIG. 23, the charging connection end group 81 includes a first charging connection end 811 and a second charging connection end 812, and the bridge arm converter 13 includes a first phase bridge arm 131, a second phase bridge arm 132, and a third phase bridge arm 133. The first phase bridge arm 131, the second phase bridge arm 132, and the third phase bridge arm 133 are connected in parallel to form a first confluence end and a second confluence end, the second confluence end is connected to the second charging connection end 812, an end of the inductor 12 is connected to the first charging connection end 811, and the other end of the inductor 12 is connected to a midpoint of the first phase bridge arm 131. The drive output connection end group 82 includes a first drive output connection end 821, a second drive output connection end 822, and a third drive output connection end 823. The first drive output connection end 821 is connected to the midpoint of the first phase bridge arm 131, the second drive output connection end 822 is connected to a midpoint of the second phase bridge arm 132, and the third drive output connection end 823 is connected to a midpoint of the third phase bridge arm 133. An input end of the voltage transformation unit 14 is respectively connected to the midpoint of the second phase bridge arm 132 and the midpoint of the third phase bridge arm 133, and an input end of the first bidirectional H-bridge 15 is connected to an output end of the voltage transformation unit. The energy storage connection end group 83 includes a first energy storage connection end 831 and a second energy storage connection end 832. The first energy storage connection end 831 is connected to the first confluence end, the second energy storage connection end 832 is connected to the second confluence end, and an output end of the first bidirectional H-bridge 15 is respectively connected to the first energy storage connection end 831 and the second energy storage connection end 832.

In another embodiment of this application, the first charging connection end. 811 and the second charging connection end 812 in the charging connection end group 81 may be connected to an external charging port 2 respectively, the first drive output connection end 821, the second drive output connection end 822, and the third drive output connection end 823 in the drive output connection end group 82 may be connected to an external motor 4 respectively, and the first energy storage connection end 831 and the second energy storage connection end 832 in the energy storage connection end group 83 may be connected to an external battery 3 respectively.

In this embodiment, the charging connection end group 81 supplies power the inductor 12 and the bridge arm converter 13, the inductor 12, the bridge arm converter 13, the voltage transformation unit 14, and the first bidirectional H-bridge 15 form, by using the energy storage connection end group 83, a charging circuit for charging the external battery 3, and the external battery 3 and the bridge arm converter 13 supply power to the external motor 4 by using the drive output connection end group 82 and the energy storage connection end group 83, to drive the external motor 4.

In another embodiment of this application, in an implementation of this application, the charging connection end group 81 is connected to the external charging port 2, and the charging connection end group 81 uses one of a connecting line, a connector, or a connecting interface. The drive output connection end group 82 is connected to the external motor 4, and the drive output connection end group 82 uses one of the connecting line, the connector, or the connecting interface. The energy storage connection end group 83 is connected to the external battery 3, and the energy storage connection end group 83 uses one of the connecting line, the connector, or the connecting interface.

In another embodiment of this application, in an implementation of this application, the first drive output connection end 821, the second drive output connection end 822, and the third drive output connection end 823 are connected to a first phase coil, a second phase coil, and a third phase coil of the motor coil 41 in the external motor 4 respectively, and the first drive output connection end 821, the second drive output connection end 822, and the third drive output connection end 823 each include a drive connecting line, a drive output connector, or an energy storage connecting interface.

In another embodiment of this application, in an implementation of this application, the external battery 3 is respectively connected to the first energy storage connection end 831 and the second energy storage connection end 832, and the first energy storage connection end 831 and the second energy storage connection end 832 each include an energy storage connecting line, an energy storage connector, or an energy storage connecting interface.

Figure 24:
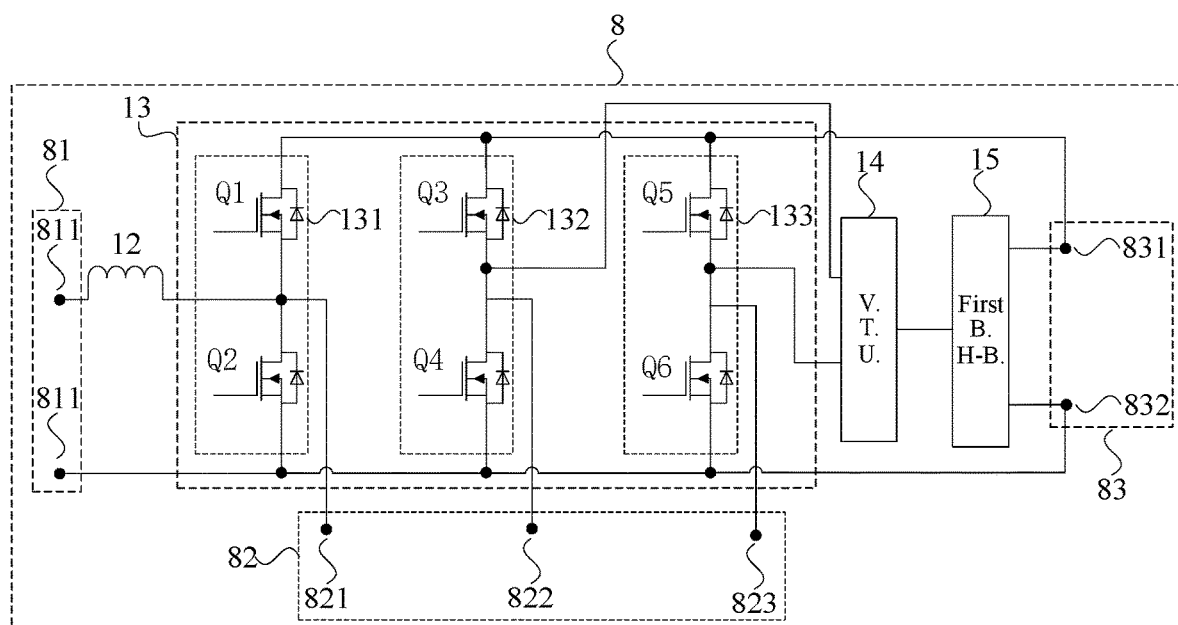
FIG. 24 is a schematic diagram of a circuit structure of an apparatus according to a fourteenth embodiment of this application.

In another embodiment of this application, in an implementation of this application, as shown in FIG. 24, the first phase bridge arm 131 includes a first power switch Q1 and a second power switch Q2 connected in series, the second phase bridge arm 132 includes a third power switch Q3 and a fourth power switch Q4 connected in series, and the third phase bridge arm 133 includes a fifth power switch Q5 and a sixth power switch Q6 connected in series.

Specifically, a first midpoint between the first power switch Q1 and the second power switch Q2 is connected to the inductor 12, a second midpoint between the third power switch Q3 and the fourth power switch Q4 is connected to the voltage transformation unit 14, a third midpoint between the fifth power switch Q5 and the sixth power switch Q6 is connected to the voltage transformation unit 14, a first end of the first power switch Q1, a first end of the third power switch Q3, and a first end of the fifth power switch Q5 are connected together to form a first confluence end of the bridge arm converter 13, a second end of the second power switch Q2, a second end of the fourth power switch Q4, and a second end of the sixth power switch Q6 are connected together to form a second confluence end of the bridge arm converter 13.

In this implementation, three phase bridge arms of the bridge arm converter 13 are controlled in a three-phase interleaved control working manner, so that when the energy conversion apparatus 1 performs charging, a DC-side ripple is reduced and a charging power is increased. In addition, in a charging mode, the first phase bridge arm 131 may cooperate with the inductor 12 to complete the PFC, boosting is performed by using the first power switch Q1, and a DC voltage is outputted. By controlling cooperation between the power switches in the second phase bridge arm 132 and the third phase bridge arm 133, the second phase bridge arm 132 and the third phase bridge arm 133 may convert the DC into a high-frequency AC. In a drive mode, by controlling the three phase bridge arms in the bridge arm converter 13, electric energy inputted by the external battery 3 is converted, and a voltage and a current of the motor coil 41 are adjusted, to drive the external motor 4.

Figure 25:
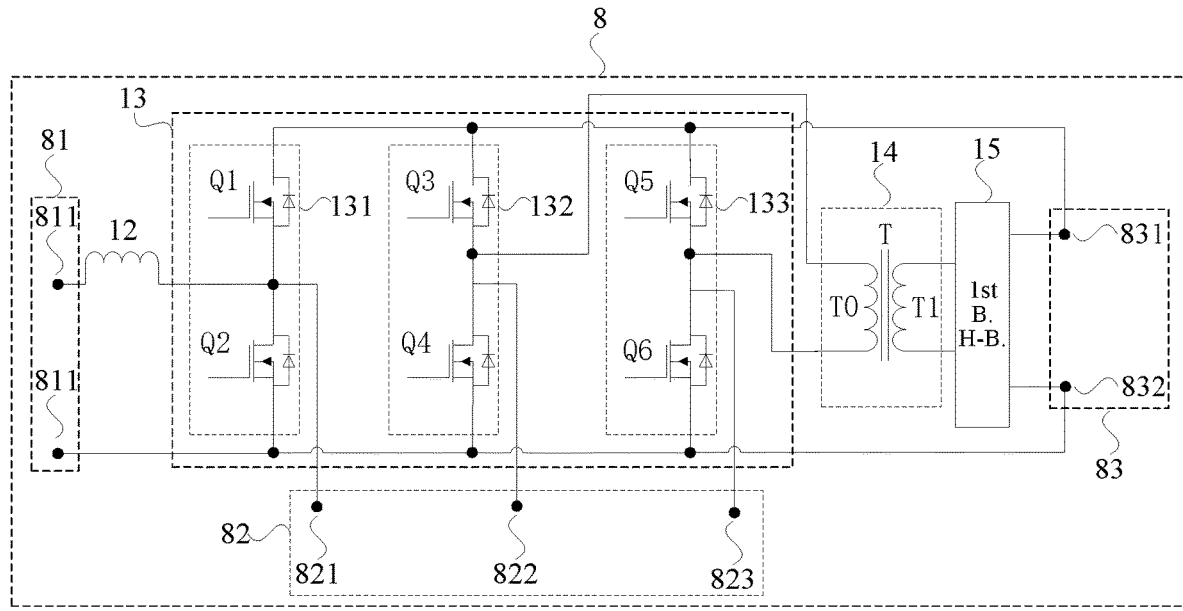
FIG. 25 is a schematic diagram of a circuit structure of an apparatus according to a fifteenth embodiment of this application.

In another embodiment of this application, in an implementation of this application, as shown in FIG. 25, the voltage transformation unit 14 in the energy conversion apparatus 8 includes a primary coil T0 and a first secondary coil T1.

Referring to FIG. 25, an end of the primary coil T0 is connected to the second midpoint, the other end of the primary coil T0 is connected to the third midpoint, and the first secondary coil T1 is connected to the first bidirectional H-bridge 15.

In this implementation, by using the voltage transformation unit 14 including the primary coil T0 and the first secondary coil T1, the inputted high-frequency AC may be converted into another high-frequency AC for output in a formed DC charging loop, and circuits on two sides of the voltage transformation unit 14 are isolated, thereby avoiding electrostatic interference between the circuits on the two sides. In addition, in the DC charging loop, the second phase bridge arm 132 and the third phase bridge arm 133 are reused, and the DC is converted into the AC, thereby simplifying a circuit structure, reducing a volume, and reducing costs.

Figure 26:
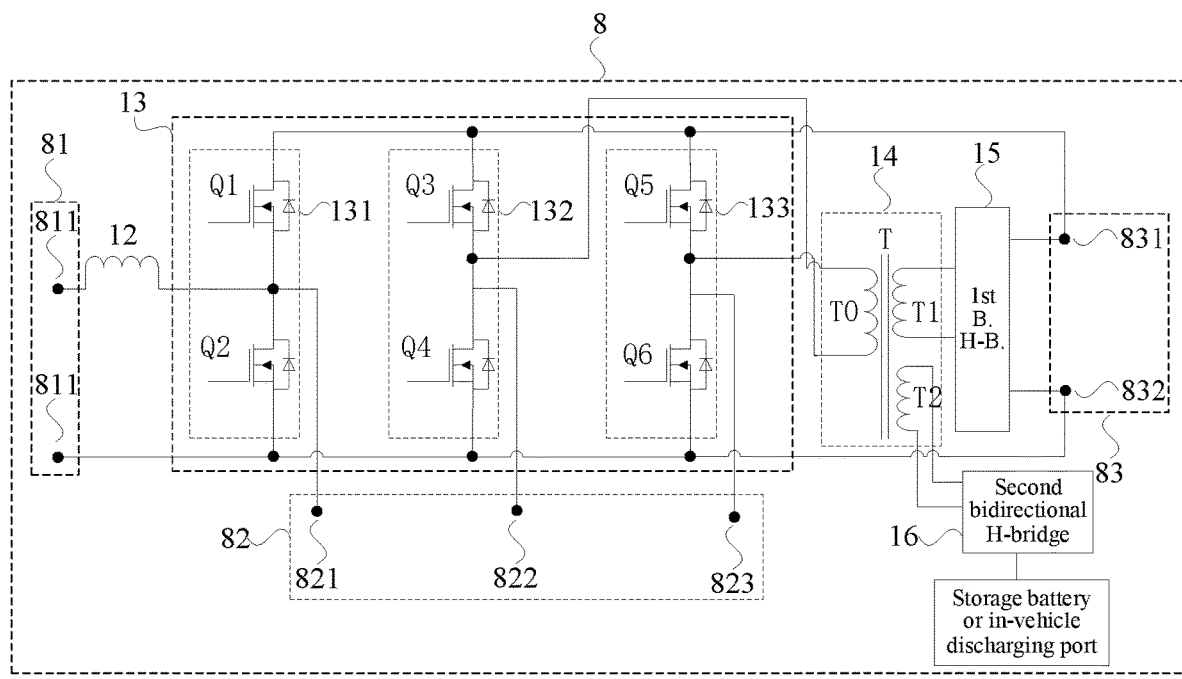
FIG. 26 is a schematic diagram of a circuit structure of an apparatus according to a sixteenth embodiment of this application.

In another embodiment of this application, in an implementation of this application, as shown in FIG. 26, the voltage transformation unit 14 in the energy conversion apparatus 8 includes a second secondary coil T2.

Specifically, the second secondary coil 12 is connected to a storage battery or an in-vehicle discharging port by a second bidirectional H-bridge 16. When the storage battery is charged, the external charging port 2, the inductor 12, the bridge arm converter 13, the voltage transformation unit 14, and the second bidirectional H-bridge 16 form a charging circuit for the storage battery. When the external charging port 2 is connected to a charging device and the in-vehicle discharging port is connected to an electricity consumption device, and the external charging port 2, the inductor 12, the bridge arm converter 13, the voltage transformation unit 14, and the second bidirectional H-bridge 16 form a charging circuit for the electricity consumption device. When the external charging port 2 is not connected to the charging device and the in-vehicle discharging port is connected to the electricity consumption device, the external battery 3, the first bidirectional H-bridge 15, the voltage transformation unit 14, and the second bidirectional H-bridge 16 form a discharging circuit for the electricity consumption device.

In this embodiment, by using the voltage transformation unit 14 including the primary coil T0, the first secondary coil T1, and the second secondary coil T2, when the energy conversion apparatus 1 works, a storage battery charging loop or an in-vehicle discharging port loop may be formed by the external charging port 2, the inductor 12, the bridge arm converter 13, the primary coil T0, the second secondary coil T2, the second bidirectional H-bridge 16, and the storage battery or the in-vehicle discharging port, so that the DC charging loop, and the storage battery charging loop or the in-vehicle discharging port loop do not interfere with each other during working, thereby improving the circuit reliability, and the external battery 3 may discharge to the electricity consumption device connected to the in-vehicle discharging port, thereby increasing functions of an overall control circuit.

It should be noted that, for a structure and a connection manner of the second bidirectional H-bridge 16, reference may be made to FIG. 11.

Figure 27:
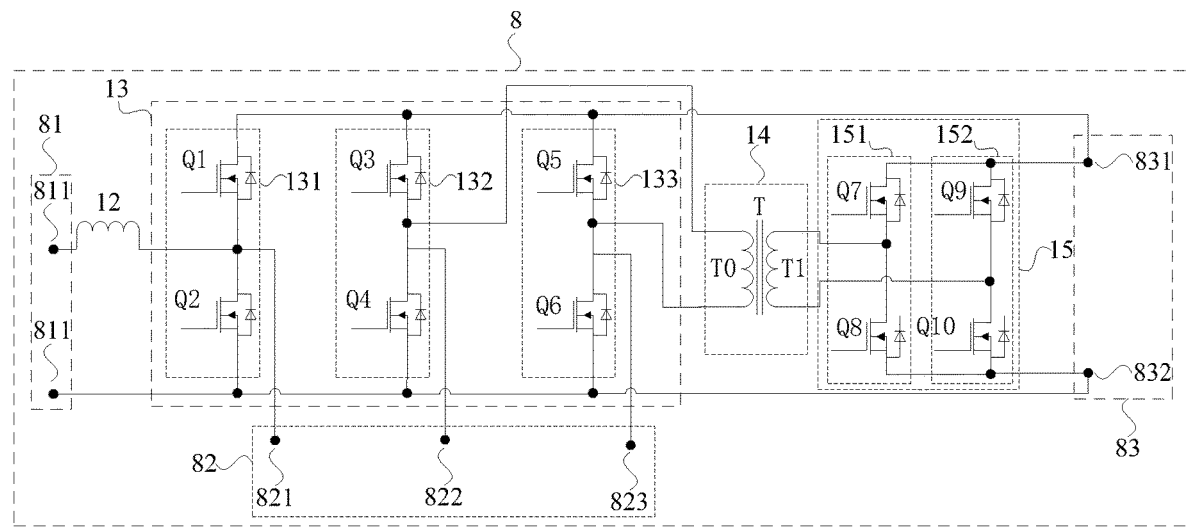
FIG. 27 is a schematic diagram of a circuit structure of an apparatus according to a seventeenth embodiment of this application.

In another embodiment of this application, in an implementation of this application, as shown in FIG. 27, the first bidirectional H-bridge 15 in the energy conversion apparatus 8 includes a seventh phase bridge arm 151 and an eighth phase bridge arm 152.

The seventh phase bridge arm 151 includes a seventh power switch Q7 and an eighth power switch Q8 connected in series, and the eighth phase bridge arm 152 includes a ninth power switch Q9 and a tenth power switch Q10 connected in series.

A fourth midpoint between the seventh power switch Q7 and the eighth power switch Q8 is connected to an end of the first secondary coil T1, a fifth midpoint between the ninth power switch Q9 and the tenth power switch Q10 is connected to the other end of the first secondary coil T1, a first end of the seventh power switch Q7 and a first end of the ninth power switch Q9 are connected together to form a third confluence end of the first bidirectional H-bridge 15, a second end of the eighth power switch Q8 and a second end of the tenth power switch Q10 are connected together to form a fourth confluence end of the first bidirectional H-bridge 15, the third confluence end is connected to the first energy storage connection end 831, and the fourth confluence end is connected to the second energy storage connection end 832.

In this implementation, the external charging port 2, the inductor 12, the first phase bridge arm 131, the second phase bridge arm 132, the third phase bridge arm 133, the primary coil T0, the first secondary coil T1, the seventh power switch Q7, the eighth power switch Q8, the ninth power switch Q9, the tenth power switch Q10, and the external battery 3 form a DC charging circuit, where the seventh power switch Q7, the eighth power switch Q8, the ninth power switch Q9, and the tenth power switch Q10 form a full-bridge rectification circuit. By using the full-bridge rectification circuit, a high-frequency AC outputted by the first secondary coil T1 is rectified into a DC, and a DC voltage with high-frequency energy is outputted, to charge the external battery 3.

In addition, in this embodiment, the external battery 3, the eighth power switch Q8, the ninth power switch Q9, the tenth power switch Q10, the voltage transformation unit 14, the bridge arm converter 13, the inductor 12, and the external charging port 2 form a DC discharging circuit. The seventh power switch Q7, the eighth power switch Q8, the ninth power switch Q9, and the tenth power switch Q10 form a full-bridge rectification circuit, and the DC inputted by the external battery 3 is converted into the AC by using the full-bridge rectification circuit.

It should be noted that, because the energy conversion apparatus 8 has the same working principle as that of the foregoing energy conversion apparatus 1, and connection relationships and structures among the inductor 12, the bridge arm converter 13, the voltage transformation unit 14, the first bidirectional H-bridge 15, and the second bidirectional H-bridge 16 are the same, the working principle of the energy conversion apparatus 8 is not described in detail herein again.

In this embodiment, in the energy conversion apparatus 8 provided in this application, by integrating the charging connection end group 81, the bridge arm converter 13, the inductor 12, the drive output connection end group 82, the voltage transformation unit 14, the first bidirectional H-bridge 15, and the energy storage connection end group 83 in one circuit, the drive of the external motor 4 can be implemented by using the bridge arm converter 13. A voltage outputted by the first phase bridge arm 131 is increased while PFC is implemented by using the cooperation between the first phase bridge arm 131 in the bridge arm converter 13 and the inductor 12. The DC may be converted into the AC by using the second phase bridge arm 132 and the third phase bridge arm 133 in the bridge arm converter 13, and AC charging and discharging and DC charging and discharging of the vehicle battery may be further performed by using the energy conversion apparatus 8. The bridge arm converter 13 is reused, thereby simplifying the circuit structure, improving the circuit integration, reducing the circuit costs, reducing the circuit volume, and achieving a simple circuit structure.

In addition, because the energy conversion apparatus 1 provided in this application may work in both the AC charging mode and the AC discharging mode, application scenarios of charging are increased, and an application scope is expanded.

Figure 28:
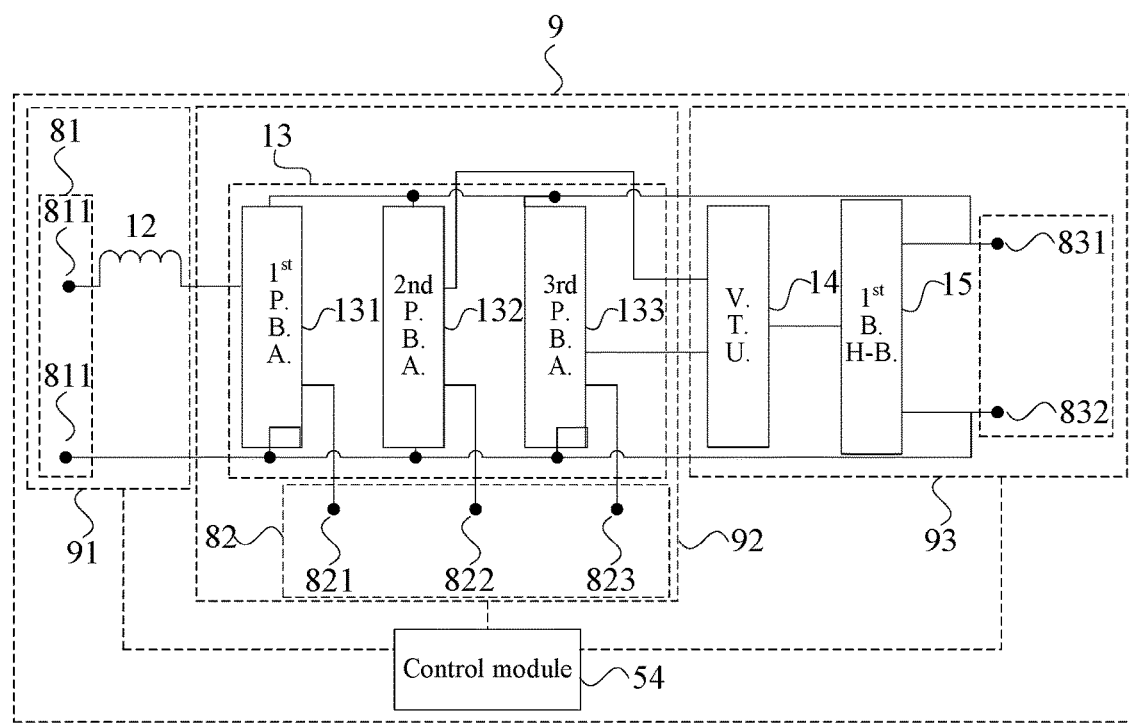
FIG. 28 is a schematic structural diagram of a power system according to an eighteenth embodiment of this application.

As shown in FIG. 28, this application further provides a power system 9. The power system 9 includes an energy conversion apparatus 8 and a control module 54, where the energy conversion apparatus 8 includes an in-vehicle charging module 91, a motor control module 92, and a bidirectional DC/DC module 93.

The in-vehicle charging module 91 includes an inductor 12 and a charging connection end group 81, where the charging connection end group 81 includes a first charging connection end 81 and a second charging connection end 82, and an end of the inductor 12 is connected to the first charging connection end 81. The motor control module 92 includes a bridge arm converter 13 and a drive output connection end group 82, where the bridge arm converter 13 includes a first phase bridge arm 131, a second phase bridge arm 132, and a third phase bridge arm 133, a midpoint of the first phase bridge arm 131 is connected to the other end of the inductor 12, the first phase bridge arm 131, the second phase bridge arm 132, and the third phase bridge arm 133 are connected in parallel to form a first confluence end and a second confluence end, and the second confluence end is connected to the second charging connection end 82. The drive output connection end group 82 includes a first drive output connection end 821, a second drive output connection end 822, and a third drive output connection end 823, where the first drive output connection end 821 is connected to the midpoint of the first phase bridge arm 131, the second drive output connection end 822 is connected to a midpoint of the second phase bridge arm 132, and the third drive output connection end 823 is connected to a midpoint of the third phase bridge arm 133. The bidirectional DC/DC module 93 includes a voltage transformation unit 14, a first bidirectional H-bridge 15, and an energy storage connection end group 83, where an input end of the voltage transformation unit 14 is respectively connected to the midpoint of the second phase bridge arm 132 and the midpoint of the third phase bridge arm 133, and an output end of the voltage transformation unit 14 is connected to an input end of the first bidirectional H-bridge 15. The energy storage connection end group 83 includes a first energy storage connection end 831 and a second energy storage connection end 832, where the first energy storage connection end 831 is connected to the first confluence end, the second energy storage connection end 832 is connected to the second confluence end, and an output end of the first bidirectional H-bridge 15 is respectively connected to the first energy storage connection end 831 and the second energy storage connection end 832.

In another embodiment of this application, in an implementation of this application, referring to FIG. 28, the first charging connection end 811 and the second charging connection end 812 are connected to the external charging port 2 respectively, the first drive output connection end 821, the second drive output connection end 822, and the third drive output connection end 823 are connected to a first phase coil, a second phase coil, and a third phase coil of the motor coil 41 in the external motor 4 respectively, and the external battery 3 is respectively connected to the first energy storage connection end 831 and the second energy storage connection end 832.

In another embodiment of this application, the energy conversion apparatus 8 in the system 9 further includes a switch module 19, and the control module 54 is configured to control the switch module 19, to implement switching between a charging mode and a drive mode.

It should be noted that, the switch module 19 of the energy conversion apparatus 8 and that of the energy conversion apparatus 1 have the same structure, also have the same disposition, and also have the same function. For the switch units in the energy conversion apparatus 8, reference may be made to FIG. 18 and FIG. 19. The control module 54 controls the switch units in the switch module 19 and power switches in the energy conversion apparatus 1 to switch a working mode of the energy conversion apparatus 1.

Specifically, when the energy conversion apparatus 8 works in the drive mode, the external battery 3 drives, by using the bridge arm converter 13, the external motor 4 to work. Specifically, the external battery 3 provides a DC to the bridge arm converter 13, the first phase bridge arm 131 in the bridge arm converter 13 converts the DC into a three-phase AC and inputs the three-phase AC to the external motor 4 to drive the external motor 4 to run, the external motor 4 outputs an AC, the AC is converted by using the second phase bridge arm 132 and the third phase bridge arm 133 in the bridge arm converter 13, and a DC is outputted, and is returned to the external battery 3.

In another embodiment of this application, when the energy conversion apparatus 8 works in the charging mode, specifically, in the charging mode, the external charging port 2, the inductor 12, the bridge arm converter 13, the voltage transformation unit 14, and the first bidirectional H-bridge 15 form a charging circuit for charging the external battery 3.

A power supply provided by the external charging port 2 is a DC power supply. When a power supply provided by the external charging port 2 is a DC power supply, the external charging port 2, the inductor 12, the bridge arm converter 13, the voltage transformation unit 14, the first bidirectional H-bridge 15, and the external battery 3 form a DC charging circuit. In this case, a DC outputted by the external charging port 2 is boosted through the inductor 12 and the first phase bridge arm 131 in the bridge arm converter 13, a DC is outputted, the DC outputted by the first phase bridge arm 131 is converted by using the second phase bridge arm 132 and the third phase bridge arm 133 in the bridge arm converter 13, an AC is outputted, the voltage transformation unit 14 converts a high-frequency AC and outputs another high-frequency AC, and the first bidirectional H-bridge 15 rectifies the high-frequency AC outputted by the voltage transformation unit 14 and outputs a DC for charging the external battery 3.

In some embodiments, the external charging port 2, the inductor 12, the first phase bridge arm 131, and the external battery 3 form a DC charging circuit. In this case, the DC outputted by the external charging port 2 is boosted through the inductor 12 and the first phase bridge arm 131 in the bridge arm converter 13, and a DC is outputted to charge the external battery 3.

In addition, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

It should be noted that, in this embodiment, the principle of the DC discharging working mode is opposite to the principle of the DC charging working mode. For a specific working principle of the DC discharging working mode, reference may be made to a specific working process of the DC charging mode, and details are not described herein again.

During specific implementation, the DC power supply or the AC power supply provides a DC or an AC to the power system 9 through the external charging port 2, and the DC power supply may be a DC obtained by rectifying an external AC power supply, or may be a DC outputted by an external charging pile, which is not specifically limited herein.

In another embodiment of this application, in an implementation of this application, referring to FIG. 12, the external charging port 2 is the AC charging port 21, and the energy conversion apparatus 8 further includes a first rectification module 17a.

Specifically, the first rectification module 17a is respectively connected to the AC charging port 21, the first charging connection end 811, and the second charging connection end 812, and the first rectification module 17a is connected between the AC charging port 21 and the charging connection end group 81.

The control module 54 controls an on state and an off state of each switch in the switch module to implement switching between the AC charging mode and the drive mode. When the working mode is switched to the AC charging mode, the control module 54 is configured to control an AC charging circuit formed by the AC charging port 21, the first rectification module 17a, the inductor 12, the bridge arm converter 13, the voltage transformation unit 14, the first bidirectional H-bridge 15, and the external battery 3, or an AC charging circuit formed by the AC charging port 21, the first rectification module 17a, the inductor 12, the first phase bridge arm 131, and the external battery 3. When the working mode is switched to the drive mode by using the control module 54, the external battery 3, the bridge arm converter 13, and the external motor 4 form a drive circuit.

In another embodiment of this application, the external battery 3, the first bidirectional H-bridge 15, the voltage transformation unit 14, the bridge arm converter 13, the inductor 12, the first rectification module 17a, and the AC charging port 21 form an AC discharging circuit, or the external battery 3, the first phase bridge arm 131, the inductor 12, the first rectification module 17a, and the AC charging port 21 form an AC discharging circuit. In the foregoing AC discharging circuit, by switching a power switch in the first rectification module 17a, the DC is converted into the AC, for the AC charging port 21 to discharge.

In this embodiment, the first rectification module 17a rectifies the AC outputted by the AC charging port 21 into the to charge the external battery 3, or the first rectification module 17a converts the DC into the AC, for the AC charging port 21 to discharge.

In another embodiment of this application, in an implementation of this application, referring to FIG. 14, the external charging port 2 is the AC charging port 21 and the DC charging port 22, and the energy conversion apparatus 8 further includes a second rectification module 17b.

Specifically, the second rectification module 17b is respectively connected to the AC charging port 21, the first charging connection end 811, and the second charging connection end 812, the first rectification module 17a is connected between the AC charging port 21 and the charging connection end group 81, and the DC charging port 22 is respectively connected to the first charging connection end 811 and the second charging connection end 812.

The control module 54 controls an on state and an off state of each switch in the switch module to implement switching among the AC charging mode, the DC charging mode, and the drive mode. When the working mode is switched to the AC charging mode, the AC charging port 21, the second rectification module 17b, the inductor 12, the bridge arm converter 13, the voltage transformation unit 14, the first bidirectional H-bridge 15, and the external battery 3 form an AC charging circuit, or the AC charging port 21, the second rectification module 17b, the inductor 12, the first phase bridge arm 131, and the external battery 3 form an AC charging circuit.

In another embodiment of this application, the external battery 3, the first bidirectional H-bridge 15, the voltage transformation unit 14, the bridge arm converter 13, the inductor 12, the second rectification module 17b, and the AC charging port 21 form an AC discharging circuit, or the external battery 3, the first phase bridge arm 131, the inductor 12, the second rectification module 17b, and the AC charging port 21 form an AC discharging circuit. In the foregoing AC discharging circuit, by switching a power switch in the second rectification module 17b, the DC is converted into the AC, for the AC charging port 21 to discharge.

When the working mode is switched to the DC charging mode, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm of the bridge arm converter 13, and the external battery 3 form a DC charging circuit.

In another embodiment of this application, the external battery 3, the first bidirectional H-bridge 15, the voltage transformation unit 14, the bridge arm converter 13, the inductor 12, and the DC charging port 22 form a DC discharging circuit, or the external battery the first phase bridge arm 131, the inductor 12, and the DC charging port 22 form a DC discharging circuit.

When the working mode is switched to the drive mode, the external battery 3, the bridge arm converter 13, and the external motor 4 form a drive circuit.

In this embodiment, the second rectification module 17b rectifies the AC outputted by the AC charging port 21 into the DC, to charge the external battery 3, or the second rectification module 17b converts the DC into the AC, for the AC charging port 21 to discharge.

In another embodiment of this application, in an implementation of this application, referring to FIG. 15, the energy conversion apparatus 8 further includes a bidirectional bridge arm 18.

Specifically, the bidirectional bridge arm 18 is respectively connected to the second charging connection end 812, the first confluence end, and the second confluence end.

The control module 54 controls an on state and an off state of each switch in the switch module to implement switching among the AC charging mode, the DC charging mode, and the drive mode. When the working mode is switched to the AC charging mode, the AC charging port 21, the inductor 12, the bridge arm converter 13, the bidirectional bridge arm, the voltage transformation unit 14, the first bidirectional H-bridge 15, and the external battery 3 form an AC charging circuit.

In another embodiment of this application, the external battery 3, the first bidirectional H-bridge, the voltage transformation unit 14, the bidirectional bridge arm 18, the bridge arm converter 13, the inductor 12, and the AC charging port 21 form an AC discharging circuit. In the AC discharging circuit, the bidirectional bridge arm 18 cooperates with the first phase bridge arm 131 to form a a bidirectional H-bridge, which converts the DC into the AC, for the AC charging port 21 to discharge.

When the working mode is switched to the DC charging mode, the DC charging port 22, the inductor 12, the bridge arm converter 13, the voltage transformation unit 14, the first bidirectional H-bridge 15, and the external battery 3 form a DC charging circuit, or the DC charging port 22, the inductor 12, the first phase bridge arm, and the external battery 3 form a DC charging circuit.

In another embodiment of this application, the external battery 3, the first bidirectional H-bridge 15, the voltage transformation unit 14, the bridge arm converter 13, the inductor 12, and the DC charging port 22 form a DC discharging circuit, or the external battery 3, the first phase bridge arm 131, the inductor 12, and the DC charging port 22 form a DC discharging circuit.

When the working mode is switched to the drive mode, the external battery 3, the bridge arm converter 13, and the external motor 4 form a drive circuit.

In this embodiment, the AC charging port 21, the inductor 12, the bridge arm converter 13, the bidirectional bridge arm 18, the voltage transformation unit 14, the first bidirectional H-bridge 15, and the external battery 3 form an AC charging circuit. In the energy conversion apparatus 1, the bidirectional bridge arm 18 cooperates with the first phase bridge arm in the bridge arm converter 13 to form a bidirectional H-bridge 131, the AC is converted into the DC, and the DC is then converted into the AC by using the second phase bridge arm 132 and the third phase bridge arm 133 in the bridge arm converter 13, so that the voltage transformation unit 14 receives a high-frequency AC, and the high-frequency AC is then rectified into the DC through the first bidirectional H-bridge 15, to charge the external battery 3.

In another embodiment of this application, in an implementation of this application, the in-vehicle charging module 91, the motor control module 92, and the bidirectional DC/DC module 93 are integrated in the first box 6. It should be noted that, in other embodiments of this application, the in-vehicle charging module 91, the motor control module 92, and the bidirectional DC/DC module 93 may be disposed in two or three boxes respectively. This is not specifically limited herein.

In this embodiment, the in-vehicle charging module 91, the motor control module 92, and the bidirectional DC/DC module 93 are integrated in the first box 6, so that the overall structure of the power system 9 is more compact, and the volume of the power system 9 is further reduced, thereby reducing the weight of the vehicle to which the power system 9 is applied.

In another embodiment of this application, in an implementation of this application, the power system 9 further includes a speed reducer 56. The speed reducer 56 is power-coupled to a motor, and the speed reducer 56 and the motor are integrated in a second box 7.

In another embodiment of this application, in an implementation of this application, the first box 6 is fixedly connected to the second box 7.

During specific implementation, the first box 6 and the second box 7 may be connected by any connecting member having a fixing function, or a fixing member that may be connected to the second box 7 is disposed on the first box 6, or a fixing member that may be connected to the first box 6 is disposed on the second box 7. This is not specifically limited herein.

In this embodiment, the first box 6 and the second box 7 are fixed, to effectively avoid the separation between the first box 6 and the second box 7, thereby ensuring that the in-vehicle charging module 91, the motor control module 92, the bidirectional DC/DC module 93, the external motor 4, and the speed reducer 56 do not have a failure due to the falling of the boxes, and improving the working reliability and stability of the power system 9.

It should be noted that, for detailed working principles and specific working processes of the energy conversion apparatus 8, the control module 54, and the switch module in the power system 9 in this embodiment, reference may be made to the foregoing detailed description of the energy conversion apparatus 8, and details are not described herein again.

In another embodiment of this application, this application further provides a vehicle. The vehicle includes the power system 5 or the power system 9 described in the foregoing embodiments. For a specific working principle of the power system 9 in the vehicle in the embodiments of this application, reference may be made to the foregoing detailed description of the power system 5 or the power system 9, and details are not described herein again.

In this application, in the vehicle provided in this application, by using the power system 5 including the in-vehicle charging module 51, the motor control module 52, the bidirectional DC/DC module 53, and the control module 54 or using the power system 9 including the in-vehicle charging module 91, the motor control module 92, the bidirectional DC/DC module 93, and the control module 94, when the power system 5 or the power system 9 is applied, the vehicle may work in the drive mode, the DC charging mode, and the AC charging mode in a time-sharing manner, to implement motor drive and battery charging of the vehicle by using the same circuit structure. The circuit integration is high, and the circuit structure is simple, thereby reducing circuit costs, reducing a circuit volume, and resolving existing problems that an overall circuit of the motor drive and charging system has a complex structure, low integration, a large volume, and high costs.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In addition, the terms "first" and "second" are used for the purpose of description only and are not to be construed as indicating or implying relative importance or implicitly indicating the number of technical features indicated. Therefore, features defining "first" and "second" may explicitly or implicitly include one or more such features. In the description of this application, "a plurality of" means two or more, unless otherwise defined explicitly and specifically.

In this application, unless otherwise explicitly specified or defined, the terms such as "install", "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediate medium, or internal communication between two elements or an interaction relationship between two elements. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being right above or obliquely above the second feature, or may merely indicate that a horizontal height of the first feature is higher than that of the second feature. The first feature being located "under", "below" and "down" the second feature may be the first feature being right below or obliquely below the second feature, or merely indicates that a horizontal height of the first feature is less than that of the second feature.

In the description of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, exemplary description of the foregoing terms does not necessarily refer to a same embodiment or example. Moreover, the specific feature, structure, material, or characteristic described may be combined in any one or more embodiments or examples in a suitable manner. In addition, with no conflict, a person skilled in the art may integrate or combine different embodiments or examples described in the specification and features of the different embodiments or examples.

Although the embodiments of this application have been shown and described above, it may be understood that the foregoing embodiments are exemplary and cannot be understood as a limitation to this application. A person of ordinary skill in the art may make changes, modifications, replacements, or variations to the foregoing embodiments within the scope of this application.

What is claimed is:

1. An energy conversion apparatus, comprising:
   an inductor, wherein a first end of the inductor is connected to an external charging port;

a bridge arm converter, connected between an external battery and the external charging port, wherein the bridge arm converter comprises a first phase bridge arm, a second phase bridge arm, and a third phase bridge arm connected in parallel, and a second end of the inductor is connected to the first phase bridge arm;

a voltage transformer, wherein an input end of the voltage transformer is connected to the second phase bridge arm and the third phase bridge arm; and a first bidirectional H-bridge, connected between an output end of the voltage transformer and the external battery, wherein the external battery is connected to an external motor by the bridge arm converter, and the external charging port is connected to the external battery by the inductor, the bridge arm converter, the voltage transformer, and the first bidirectional H-bridge, and the external battery drives the external motor by using the energy conversion apparatus, and the external charging port is connected to a power supply, and charges the external battery by using the energy conversion apparatus.

2. The energy conversion apparatus according to claim 1, wherein the external battery, the bridge arm converter, and the external motor form a drive circuit for driving the external motor;

the external charging port, the inductor, the bridge arm converter, the voltage transformer, and the first bidirectional H-bridge form a charging circuit for charging the external battery; and the drive circuit and the charging circuit share the bridge arm converter.

3. The energy conversion apparatus according to claim 1, wherein the first phase bridge arm comprises a first power switch and a second power switch connected in series, and a first midpoint between the first power switch and the second power switch is connected to the inductor;

the second phase bridge arm comprises a third power switch and a fourth power switch connected in series, and a second midpoint between the third power switch and the fourth power switch is connected to the voltage transformer;

the third phase bridge arm comprises a fifth power switch and a sixth power switch connected in series, and a third midpoint between the fifth power switch and the sixth power switch is connected to the voltage transformer;

a first end of the first power switch, a first end of the third power switch, and a first end of the fifth power switch are connected together to form a first confluence end of the bridge arm converter; a second end of the second power switch, a second end of the fourth power switch, and a second end of the sixth power switch are connected together to form a second confluence end of the bridge arm converter, and the second confluence end is connected to the external charging port; the first confluence end is connected to a first end of the external battery, and the second confluence end is connected to a second end of the external battery; and the external motor comprises a motor coil, the first midpoint is connected to a first phase coil of the motor coil, the second midpoint is connected to a second phase coil of the motor coil, and the third midpoint is connected to a third phase coil of the motor coil.

4. The energy conversion apparatus according to claim 3, further comprising:

a first capacitor, connected between the first confluence end and the second confluence end.

5. The energy conversion apparatus according to claim 3, wherein the voltage transformer comprises:

a primary coil, wherein a first end of the primary coil is connected to the second midpoint, and a second end of the primary coil is connected to the third midpoint; and a first secondary coil, connected to the first bidirectional H-bridge.

6. The energy conversion apparatus according to claim 5, wherein the voltage transformer comprises:

a second secondary coil, connected to a storage battery or an in-vehicle discharging port by a second bidirectional H-bridge.

7. The energy conversion apparatus according to claim 5, wherein a first inductor is disposed between the primary coil and the second midpoint, and a second capacitor is disposed between the primary coil and the third midpoint.

8. The energy conversion apparatus according to claim 5, wherein the first bidirectional H-bridge comprises:

a seventh phase bridge arm, comprising a seventh power switch and an eighth power switch connected in series, wherein a fourth midpoint between the seventh power switch and the eighth power switch is connected to a first end of the first secondary coil; and an eighth phase bridge arm, comprising a ninth power switch and a tenth power switch connected in series, wherein a fifth midpoint between the ninth power switch and the tenth power switch is connected to a second end of the first secondary coil, wherein a first end of the seventh power switch and a first end of the ninth power switch are connected together to form a third confluence end of the first bidirectional H-bridge, a second end of the eighth power switch and a second end of the tenth power switch are connected together to form a fourth confluence end of the first bidirectional H-bridge; and the third confluence end is connected to the first end of the external battery, and the fourth confluence end is connected to the second end of the external battery.

9. The energy conversion apparatus according to claim 8, wherein a second inductor is disposed between the first secondary coil and the fourth midpoint, and a third capacitor is disposed between the first secondary coil and the fifth midpoint.

10. The energy conversion apparatus according to claim 8, further comprising:

a fourth capacitor, connected between the third confluence end and the fourth confluence end.

11. The energy conversion apparatus according to claim 1, wherein the external charging port comprises an alternating current (AC) charging port, and the energy conversion apparatus further comprises:

a first rectifier, connected to the AC charging port, the inductor, and the bridge arm converter, wherein the AC charging port, the first rectifier, the inductor, the bridge arm converter, the voltage transformer, the first bidirectional H-bridge, and the external battery form an AC charging circuit or an AC discharging circuit.

12. The energy conversion apparatus according to claim 1, wherein the external charging port comprises an alternating current (AC) charging port and a direct current (DC) charging port, and the energy conversion apparatus further comprises:

a second rectifier, connected to the AC charging port, the inductor, and the bridge arm converter, wherein the DC charging port is connected to the inductor and the bridge arm converter;

the AC charging port, the second rectifier, the inductor, the bridge arm converter, the voltage transformer, the first bidirectional H-bridge, and the external battery form an AC charging circuit or an AC discharging circuit; and the DC charging port, the inductor, the bridge arm converter, the voltage transformer, the first bidirectional H-bridge, and the external battery form a DC charging circuit or a DC discharging circuit; or the DC charging port, the inductor, the first phase bridge arm, and the external battery form a DC charging circuit or a DC discharging circuit.

13. The energy conversion apparatus according to claim 1, wherein the external charging port comprises an alternating current (AC) charging port and a direct current (DC) charging port, and the energy conversion apparatus further comprises:

a bidirectional bridge arm, connected to the AC charging port and the bridge arm converter, wherein the DC charging port is connected to the inductor and the bridge arm converter;

the AC charging port, the inductor, the bridge arm converter, the bidirectional bridge arm, the voltage transformer, the first bidirectional H-bridge, and the external battery form an AC charging circuit or an AC discharging circuit; and the DC charging port, the inductor, the bridge arm converter, the voltage transformer, the first bidirectional H-bridge, and the external battery form a DC charging circuit or a DC discharging circuit; or the DC charging port, the inductor, the first phase bridge arm, and the external battery form a DC charging circuit or a DC discharging circuit.

14. The energy conversion apparatus according to claim 13, wherein the bidirectional bridge arm comprises:

an eleventh power switch and a twelfth power switch connected in series, a sixth midpoint between the eleventh power switch and the twelfth power switch is connected to the external charging port, a first end of the eleventh power switch is connected to a first confluence end of the bridge arm converter, and a second end of the twelfth power switch is connected to a second confluence end of the bridge arm converter.

15. A power system, comprising an energy conversion apparatus and a controller, wherein the energy conversion apparatus comprises:

an inductor, wherein a first end of the inductor is connected to an external charging port;

a bridge arm converter, connected between an external battery and the external charging port, wherein the bridge arm converter comprises a first phase bridge arm, a second phase bridge arm, and a third phase bridge arm connected in parallel, and a second end of the inductor is connected to the first phase bridge arm;

a voltage transformer, wherein an input end of the voltage transformer is connected to the second phase bridge arm and the third phase bridge arm; and a first bidirectional H-bridge, connected between an output end of the voltage transformer and the external battery, wherein the external battery is connected to an external motor by the bridge arm converter, and the external charging port is connected to the external battery by the inductor, the bridge arm converter, the voltage transformer, and the first bidirectional H-bridge, and the external battery drives the external motor by using the enemy conversion apparatus, and the external charging port is connected to a power supply, and charges the external battery by using the energy conversion apparatus;

an in-vehicle charger, comprising the inductor;

a motor controller, comprising the bridge arm converter, wherein the bridge arm converter is connected to the external charging port, the inductor, the external motor, and the external battery; and a bidirectional DC/DC converter, comprising the voltage transformer and the first bidirectional H-bridge, wherein the input end of the voltage transformer is connected to the bridge arm converter, the output end of the voltage transformer is connected to a first end of the first bidirectional H-bridge, and a second end of the first bidirectional H-bridge is connected to the external battery, wherein the controller is configured to control the energy conversion apparatus to drive the external motor.

16. The power system according to claim 15, further comprising:

a speed reducer, power-coupled to the external motor, wherein the speed reducer and the external motor are integrated in a second box.

17. A vehicle, comprising a power system comprising an energy conversion apparatus and a controller, wherein the energy conversion apparatus comprises:

an inductor, wherein a first end of the inductor is connected to an external charging port;

a bridge arm converter, connected between an external battery and the external charging port, wherein the bridge arm converter comprises a first phase bridge arm, a second phase bridge arm, and a third phase bridge arm connected in parallel, and a second end of the inductor is connected to the first phase bridge arm;

a voltage transformer, wherein an input end of the voltage transformer is connected to the second phase bridge arm and the third phase bridge arm; and a first bidirectional H-bridge, connected between an output end of the voltage transformer and the external battery, wherein the external battery is connected to an external motor by the bridge arm converter, and the external charging port is connected to the external battery by the inductor, the bridge arm converter, the voltage transformer, and the first bidirectional H-bridge, and the external battery drives the external motor by using the energy conversion apparatus, and the external charging port is connected to a power supply, and charges the external battery by using the energy conversion apparatus, an in-vehicle charger, comprising the inductor;

a motor controller, comprising the bridge arm converter, wherein the bridge arm converter is connected to the external charging port, the inductor, the external motor, and the external battery; and a bidirectional DC/DC converter, comprising the voltage transformer and the first bidirectional H-bridge, wherein the input end of the voltage transformer is connected to the bridge arm converter, the output end of the voltage transformer is connected to a first end of the first bidirectional H-bridge, and a second end of the first bidirectional H-bridge is connected to the external battery, wherein the controller is configured to control the energy conversion apparatus to drive the external motor.

* * * * *

UNITED STATES PATENT AND TRADEMARK OFFICE
CERTIFICATE OF CORRECTION

PATENT NO. : 11,855,543 B2  
APPLICATION NO. : 17/624055  
DATED : December 26, 2023  
INVENTOR(S) : Jingcui Teng et al.

Page 1 of 1

It is certified that error appears in the above-identified patent and that said Letters Patent is hereby corrected as shown below:

In the Specification

Column 3, Line 32, that reads "including a first phase bridge arm a second phase", should read -- including a first phase bridge arm, a second phase --

Column 14, Line 16, that reads "includes a bidirectional bridge arm 8", should read -- includes a bidirectional bridge arm 18 --

Column 32, Line 64, that reads "charging port 21 into the to charge the external battery 3", should read -- charging port 21 into the DC, to charge the external battery 3 --

Column 33, Line 50, that reads "or the external battery the first phase", should read -- or the external battery 3, the first phase --

Column 34, Line 16, that reads "first phase bridge arm 131 to form a a bidirectional H-bridge", should read -- first phase bridge arm 131 to form a bidirectional H-bridge --

In the Claims

Claim 15, Colum 40, Line 4, that reads "enemy conversion apparatus, and the external charging", should read -- energy conversion apparatus, and the external charging --

Signed and Sealed this  
Fifth Day of March, 2024

Katherine Kelly Vidal  
*Director of the United States Patent and Trademark Office*